US006379094B1

(12) United States Patent
Porat

(10) Patent No.: US 6,379,094 B1
(45) Date of Patent: Apr. 30, 2002

(54) APPARATUS FOR TUCKING HARD BOOK COVERS

(76) Inventor: Thomas Porat, 1 Oakmont Dr., Concord, NH (US) 03301

( * ) Notice: Subject to any disclaimer, the term of this patent is extended or adjusted under 35 U.S.C. 154(b) by 0 days.

(21) Appl. No.: 09/578,145

(22) Filed: May 24, 2000

(51) Int. Cl.[7] ............................ B32B 3/04; B42C 7/00; B42C 11/04

(52) U.S. Cl. .............................. 412/9; 412/17; 412/18; 412/19; 412/21

(58) Field of Search ............................... 412/9, 17, 18, 412/19, 21

(56) References Cited

U.S. PATENT DOCUMENTS

| | | | | |
|---|---|---|---|---|
| 2,749,967 A | * | 6/1956 | E. Bach et al. | 412/17 |
| 3,786,529 A | | 1/1974 | Bendror et al. | 11/1 R |
| 4,111,739 A | | 9/1978 | De Bin et al. | 156/486 |
| 4,248,657 A | | 2/1981 | Henry | 156/443 |
| 4,889,461 A | | 12/1989 | Kampen et al. | 156/443 |
| 4,975,010 A | | 12/1990 | Karolyi | 412/3 |
| 5,259,825 A | | 11/1993 | De Angelis et al. | 156/487 |
| 5,409,341 A | * | 4/1995 | Rathert | 412/17 |
| 5,413,446 A | | 5/1995 | Rathert et al. | 156/443 |

* cited by examiner

*Primary Examiner*—Willmon Fridie, Jr.
*Assistant Examiner*—Mark T. Henderson
(74) *Attorney, Agent, or Firm*—Davis & Bujold, P.L.L.C.

(57) ABSTRACT

An apparatus (20) for facilitating folding of a cover material (6) about a spine (4) and a pair of panels (2) to form a hard book cover (8). The apparatus (20) comprises an infeed table assembly (22) for supporting the cover material (6), the spine (4) and the pair of opposed panels (2). A pressure device for receiving the cover material (6), the spine (4) and the pair of opposed panel assembly (16) and for supplying an initial pressure to the cover material/spine/panel assembly (16). A conveying and rotating mechanism (28) is provided for receiving and conveying the cover material/spine/panel assembly (16) to a fold mechanism (28). The fold mechanism (28) facilitates folding of each longitudinal free edge of the cover material (6), about a longitudinal perimeter of the spine (4) and the pair of panels (2), to form the hard book cover (8). The fold mechanism (30) includes a rotatable brush bar (70) and a mating pressure bar (82) as well as a pair of inwardly indexable tuck fingers (90) which facilitate proper tucking or nicking of the cover material (6) relative to the opposed panels (2). The fold mechanism (30) also includes a plurality of pusher fingers (76) for supporting the at least one of the opposed panels (2) and the spine (4) during folding of the cover material (6) and preventing excess deflection thereof.

20 Claims, 13 Drawing Sheets

FIG. 18
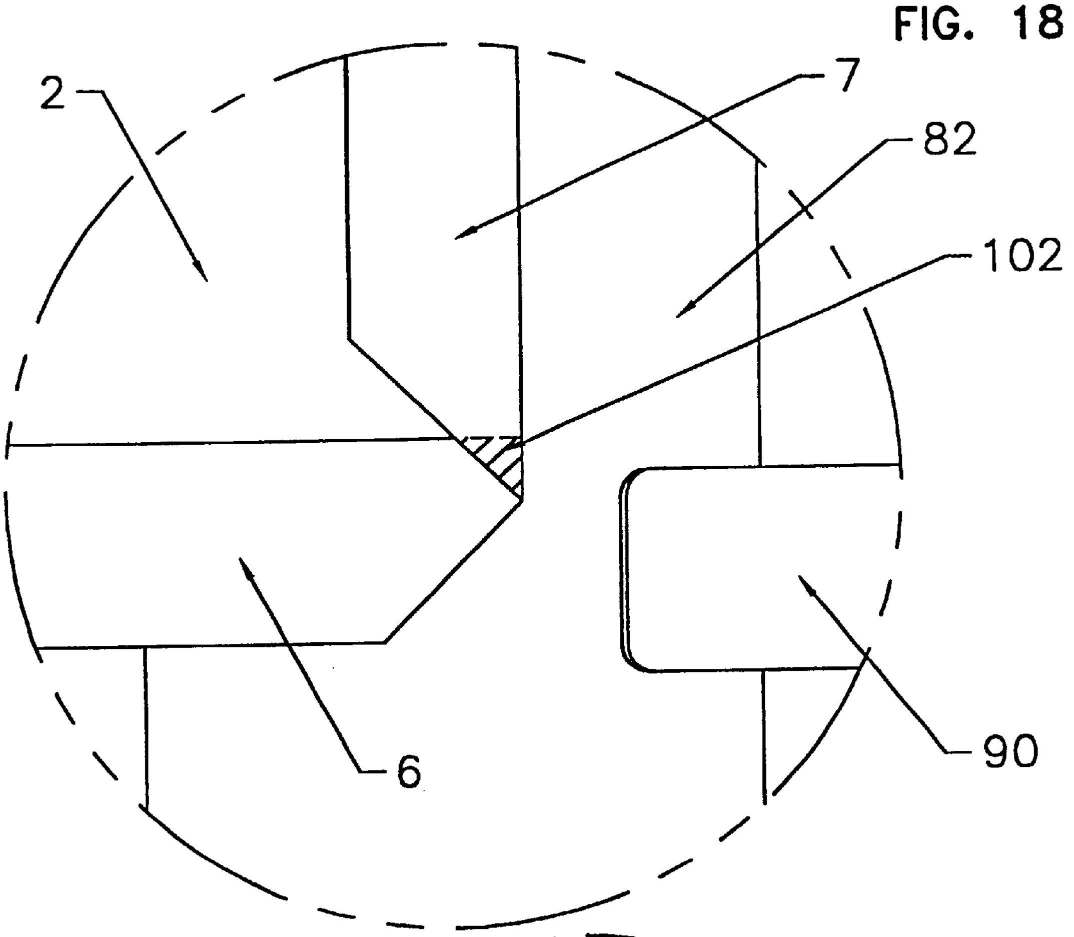
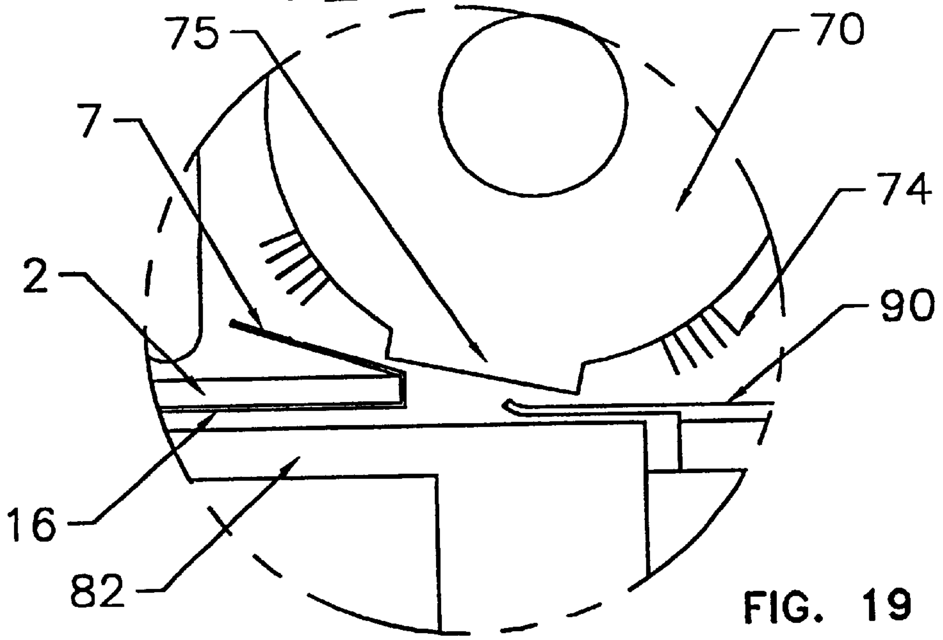
FIG. 19

FIG. 20
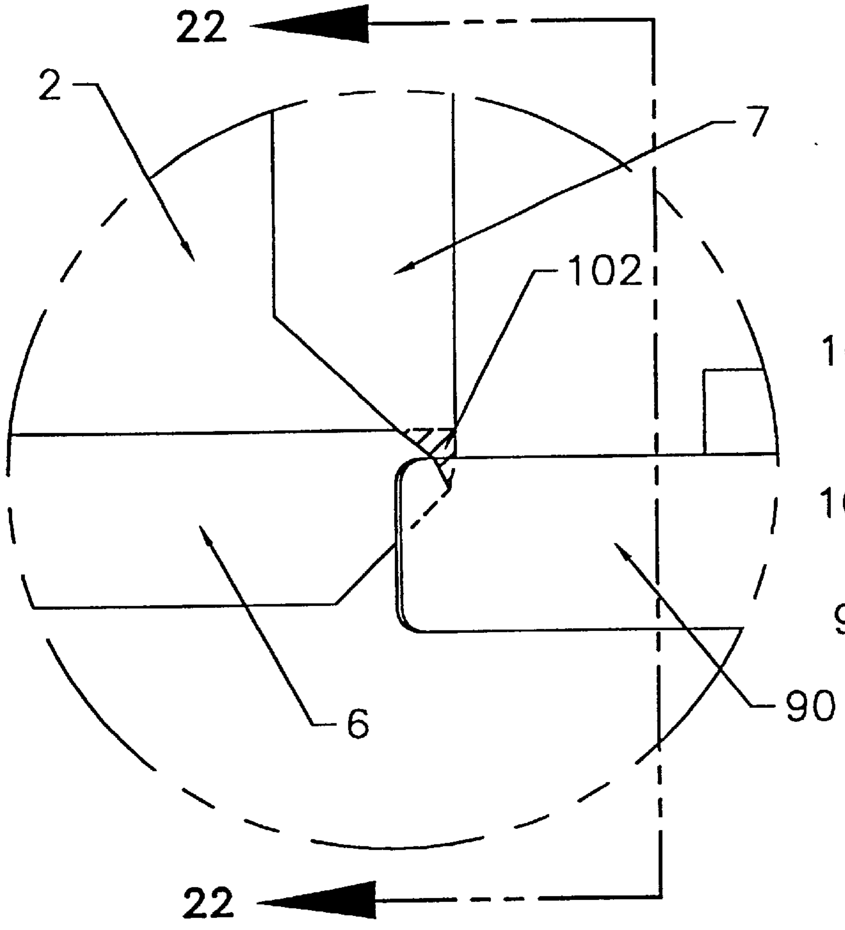
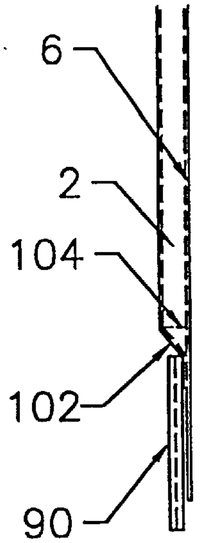
FIG. 22
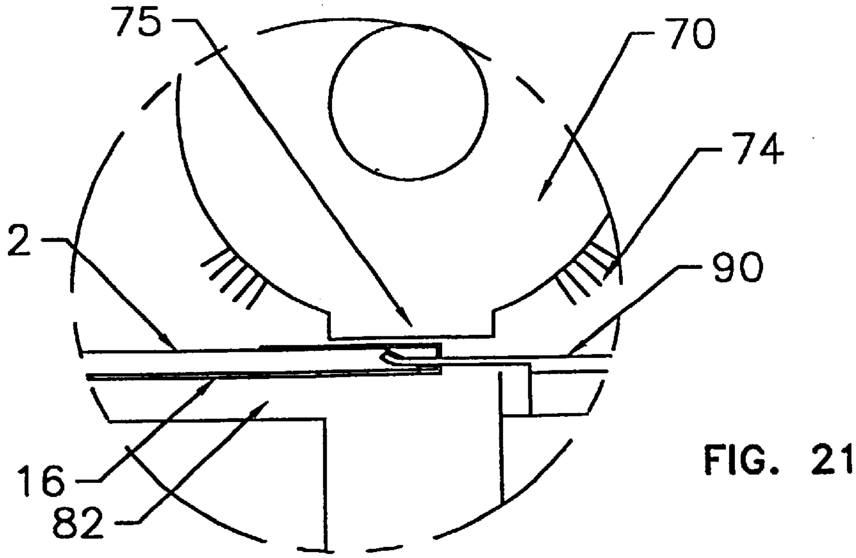
FIG. 21

FIG. 23
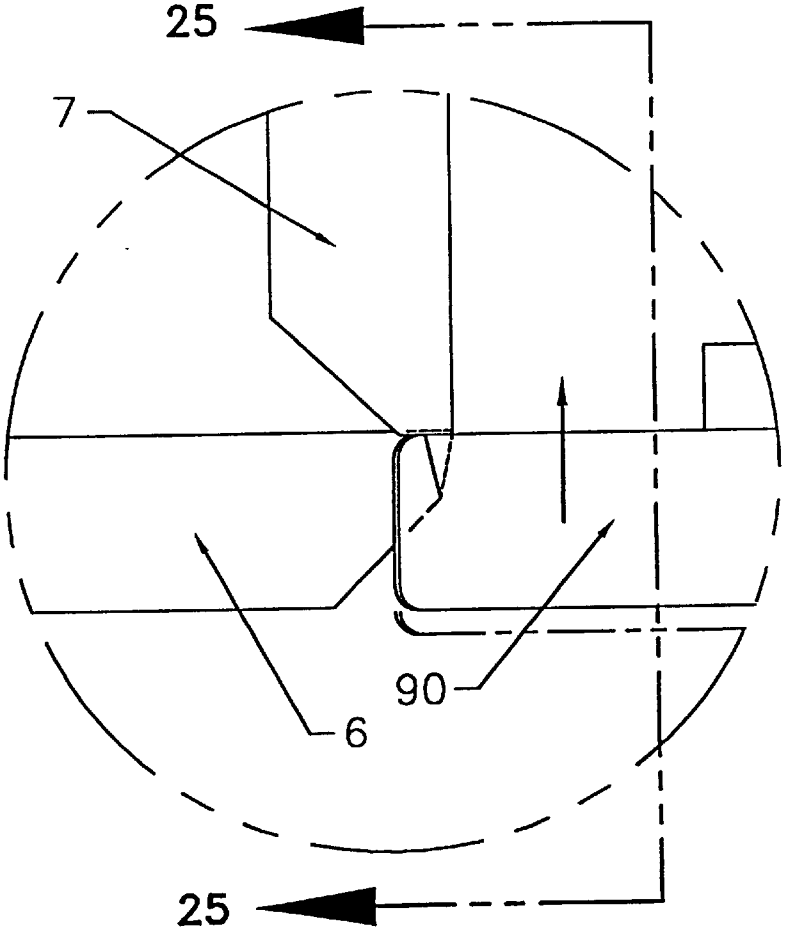
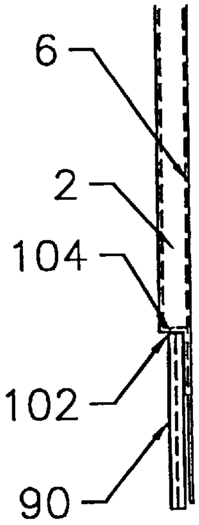
FIG. 25
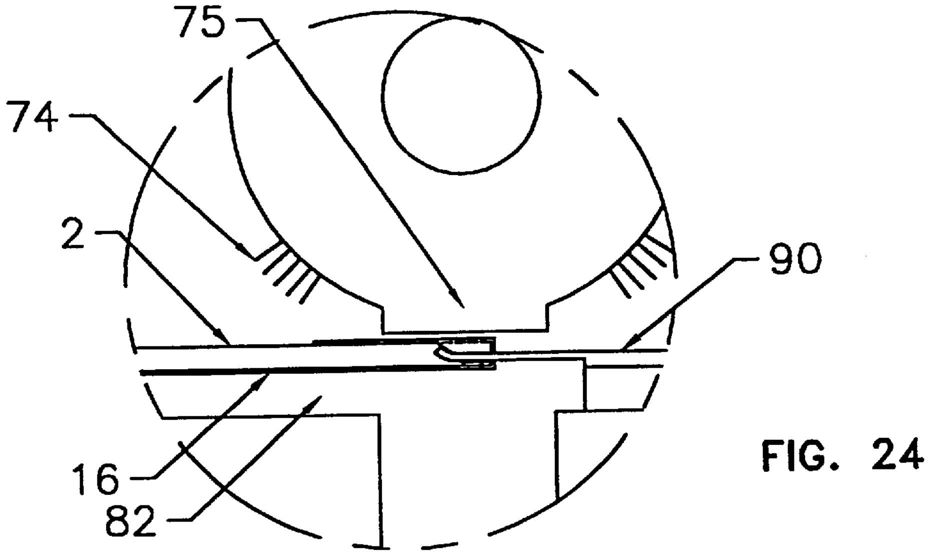
FIG. 24

APPARATUS FOR TUCKING HARD BOOK COVERS

The present invention relates to an apparatus for facilitating proper tucking or nicking of a cover material around an exposed perimeter portion of a pair of opposed panels and a centrally located spine to form a hard cover or casing for a book.

BACKGROUND OF THE INVENTION

As is conventional in the art (see FIGS. 1A and 1B), a pair of identical opposed panels 2 (only one of which is shown in these drawings) are spaced from one another by a centrally positioned spine (not shown in these Figures) and all three components are subsequently partially encased by an exterior cover material 6 to form an exterior hard book cover 8 for a book. The folding of a protruding free edge portion 7 of the cover material 6 around the perimeter of the opposed panels 2 and centrally positioned spine (not shown) is critical to provide an acceptable appearance for the book cover. In fact, one of the primary reasons why exterior hard book covers 8 are typically rejected, during an inspection process, is that the cover material 6 is not properly folded around the corner regions the panels 2 to provide an acceptable appearance.

With reference to FIG. 1A, a common problem which occurs during folding of the cover material 6, in the over the corner regions of the panels 2, is the formation of an unsightly dog-ear 10, i.e. an improperly tucked corner region. Such dog-eared formation is a primary reason why a manufactured hard cover is rejected during the inspection process.

A desired standard corner, to be achieved by the apparatus according to the present invention, is shown in FIG. 1B and designated by reference numeral 12 while a desired library corner, to be achieved by the apparatus according to the present invention, is shown in FIG. 1C and is designated by reference numeral 13.

SUMMARY OF THE INVENTION

Wherefore, it is an object of the present invention to overcome the shortcomings and drawbacks associated with the prior art hard book cover manufacturing equipment.

Another object of the present invention is to provide an apparatus for manufacturing hard book covers which consistently provides acceptable folds for the hard book covers, both standard corners (also commonly referred to as standard edition corners or square corners) and library corners, to minimize the quantity of rejections of the hard book covers during the inspection process.

A further object of the present invention is to provide a pair of tuck fingers which are automatically positioned by a computer, during the manufacturing process, at a desired location adjacent the corner regions of the panels, to provide a desired tuck or nick action to the folded cover material along the perimeter edge regions of the panels to achieve an acceptable fold.

Still another object of the present invention is to facilitate a simultaneous inward jogging or indexing of both of the tuck fingers, relative to one another during the manufacturing process, to provide a superior tuck or nick of the cover material in the corner regions of the panels and thereby result in a superior standard corner during the manufacture of a hard book cover.

A still further object of the present invention is to provide a plurality of pusher fingers which provide additional support to an edge perimeter portion of the panel(s) and the spine, while the cover material is being folded over the edge regions of the panels and the spines, thereby facilitate a superior fold of the cover material relative to those components.

Yet another object of the present invention is to provide an apparatus for folding hard book covers which is relatively easy to operate and can be manufactured at relatively low cost in comparison to conventional hard cover folding assemblies.

Still another object of the present invention is to provide a computer system for controlling each of the drives and movable actuators, of the apparatus for manufacturing hard book covers, to facilitate substantially automated production hard book covers with minimal operator intervention.

The present invention also relates to an apparatus for manufacturing a hard book cover, said apparatus comprising: a framework defining a longitudinal axis of the apparatus; an infeed table assembly, supported by the framework, for supporting a cover material, a pair of opposed panels and a centrally located spine; the cover material, the pair of opposed panels and the centrally located spine all forming a cover assembly; a conveying mechanism, supported by the framework, for receiving the cover assembly from the infeed table assembly and conveying the cover assembly to a fold mechanism; the fold mechanism, supported by the framework, for folding an exposed free end of the cover material around a longitudinal perimeter portion of the cover assembly; and a pair of tuck fingers, conveyed by a tuck finger drive mechanism, to move the pair of tuck fingers inwardly toward one another and tuck the cover material adjacent opposed corners of the panels during folding by the fold mechanism.

The present invention also relates to a method of manufacturing a hard book cover, the method comprising the steps of: defining, with a framework, a longitudinal axis of an apparatus; supporting an infeed table assembly, on the framework, for supporting a cover material, a pair of opposed panels and a centrally located spine; forming a cover assembly from the cover material, the pair of opposed panels and the centrally located spine; supporting a conveying mechanism, on the framework, for receiving the cover assembly from the pressure mechanism and conveying the cover assembly to a fold mechanism; supporting the fold mechanism, on by the framework, for folding an exposed free end of the cover material around a longitudinal perimeter portion of the cover assembly; and conveying a pair of tuck fingers, via by a tuck finger drive mechanism, to move the pair of tuck fingers inwardly toward one another and tuck the cover material adjacent a corner of the panels during folding by the fold mechanism.

BRIEF DESCRIPTION OF THE DRAWINGS

The invention will now be described, by way of example, with reference to the accompanying drawings in which:

FIG. 18 is a diagrammatic partial top plan partial view showing the hard cover book assembly being received by the fold mechanism;

FIG. 19 is a diagrammatic partial front elevation view showing the hard cover book assembly being received by the fold mechanism;

FIG. 20 is a diagrammatic partial top plan partial view showing the hard cover book assembly completely received and partially folded by the fold mechanism;

FIG. 21 is a diagrammatic partial front elevation view showing the hard cover book assembly completely received by the fold mechanism;

FIG. 22 is a diagrammatic cross-sectional partial view along section line 22—22 of FIG. 20;

FIG. 23 is a diagrammatic partial top plan partial view showing the hard cover book assembly showing the tucking action of one of the tuck fingers;

FIG. 24 is a diagrammatic partial front elevation view showing the hard cover book assembly showing the tucking action of one of the tuck fingers; and FIG. 25 is a diagrammatic cross-sectional partial view along section line 25—25 of FIG. 23;

DESCRIPTION OF THE PREFERRED EMBODIMENTS

Figure 2:
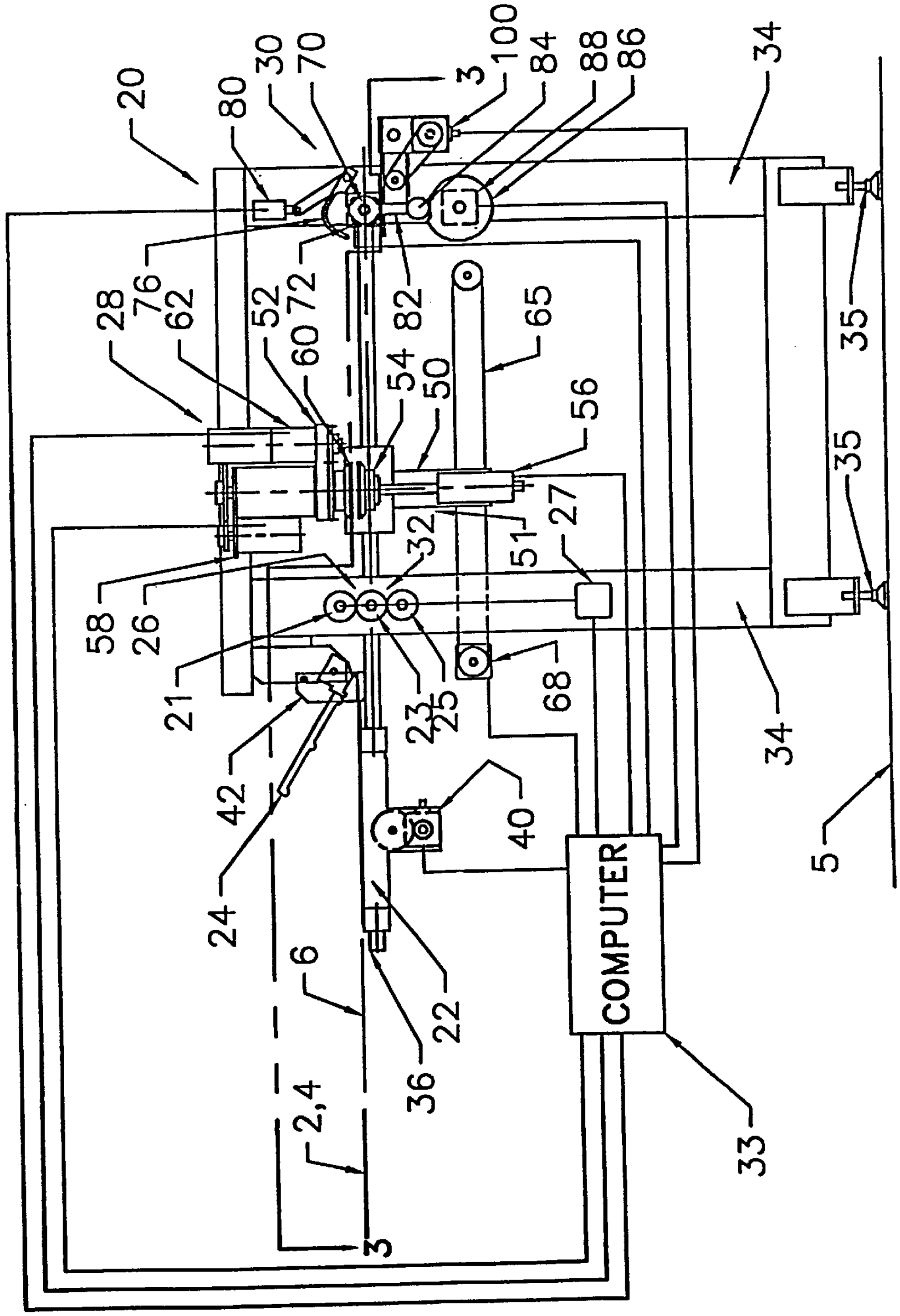
FIG. 2 is a diagrammatic front elevational view of the apparatus for manufacturing a hard book according to the present invention.
Figure 3:
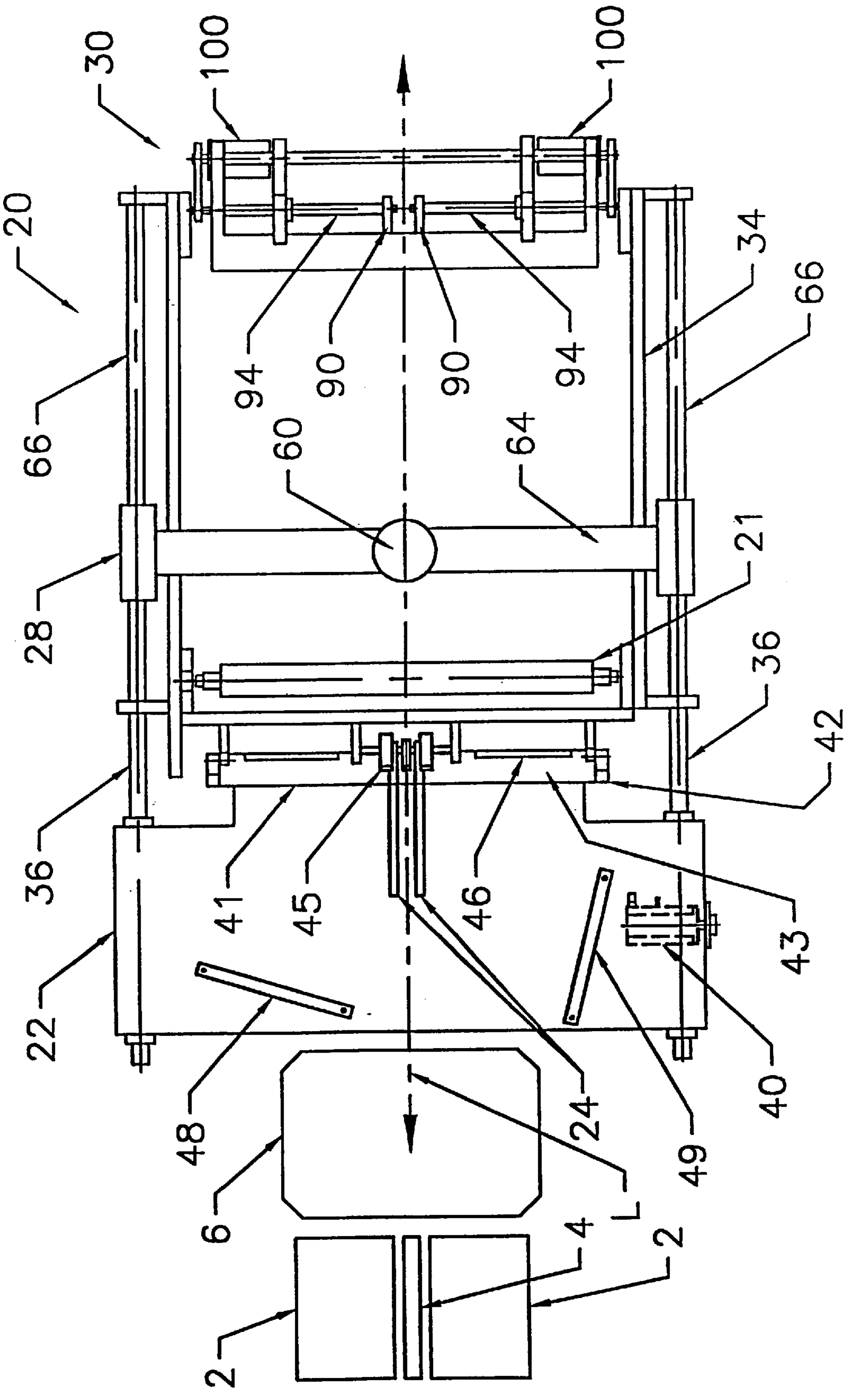
FIG. 3 is a diagrammatic top plan sectional view along section line 3—3 of FIG. 2.

With reference now to FIGS. 2 and 3, a brief description concerning the apparatus for manufacturing hard book covers 20, according to the present invention, will first be provided. This brief description will then be followed by a detailed description concerning the various individual components of the apparatus for manufacturing hard book covers 20.

Figure 4:
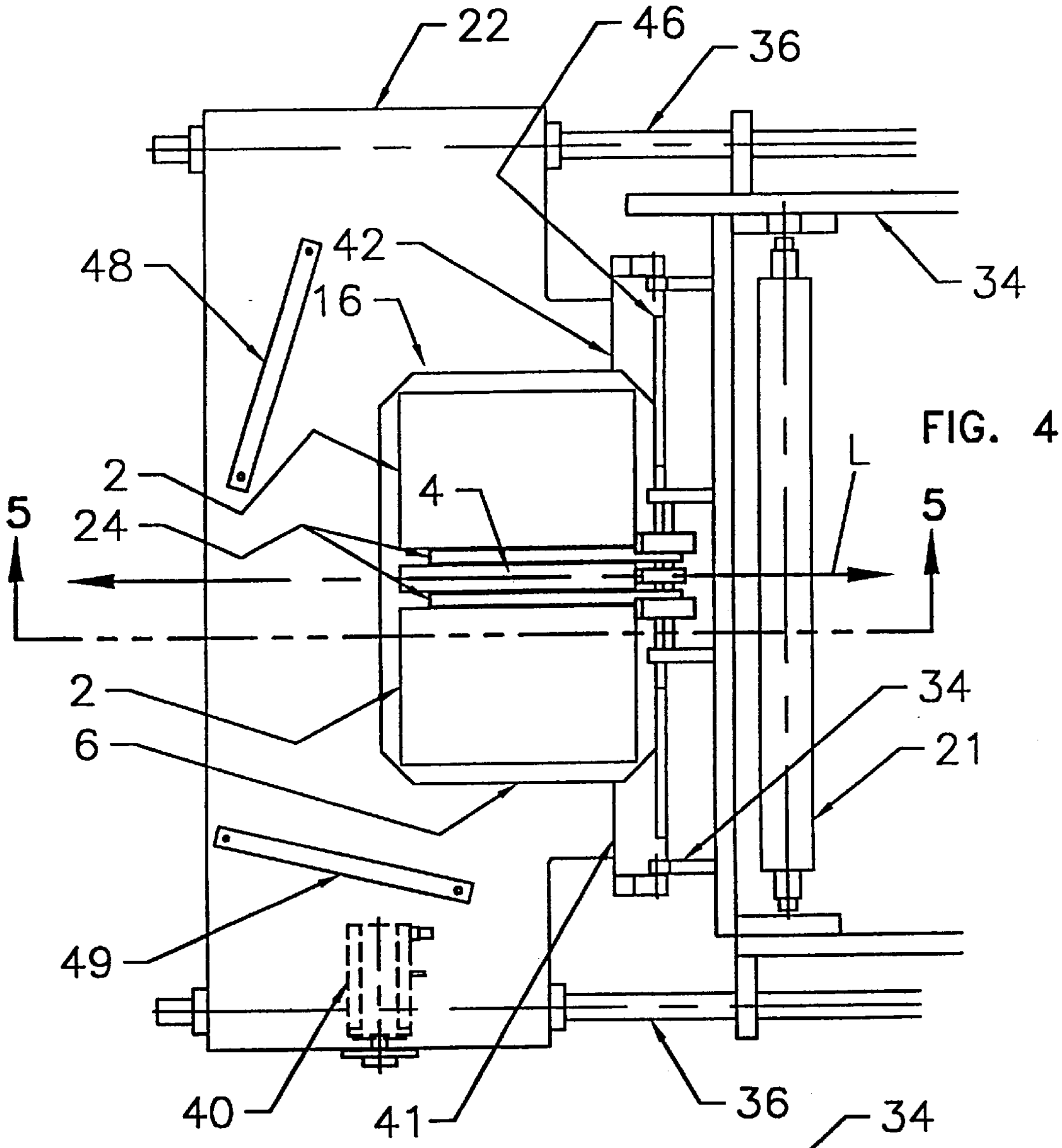
FIG. 4 is a diagrammatic top plan partial view showing placement of the two panels and the spine on the cover material supported by the infeed table assembly.
Figure 5:
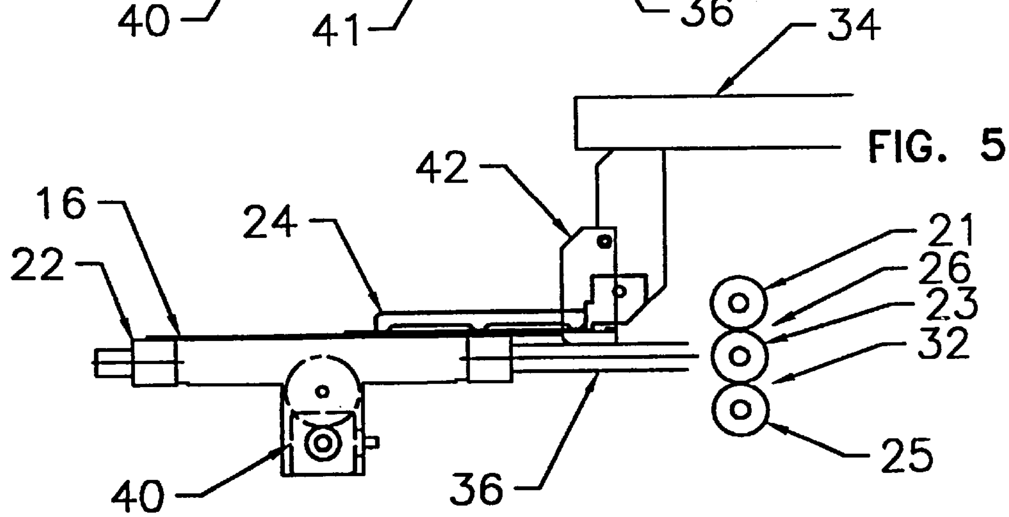
FIG. 5 is a diagrammatic cross-sectional partial view along section line 5—5 of FIG. 4.

As can be seen in these two Figures, the apparatus for manufacturing hard book covers 20 generally comprises an infeed table assembly 22. with a top surface which facilitates support of a pre-glued cover material 6 as well as a pair of opposed panels 2 and a centrally positioned spine 4. The pair of opposed panels 2 are normally spaced a desired distance from the centrally positioned spine 4 and such positioning is achieved by a pair of gage blocks 24 which are discussed below in further detail. Once the opposed panels 2 and the centrally positioned spine 4 are properly positioned on a glued upwardly facing top surface of a cover material 6 (see FIG. 4) by an operator, the hard book cover assembly 16 is then ready for manufacture. The hard book cover assembly 16 is first passed through a first pressure nip 26, formed by an upper first pair of pressure rollers (a top most first roller 21 and an intermediate roller 23), to partially adhere the rear surfaces of the opposed panels 2 and the centrally positioned spine 4 to the upwardly facing pre-glued surface of the cover material 6.

Thereafter, the unfolded but partially adhered hard book cover assembly 16 is grasped by a conveying mechanism 28, preferably a conveying and rotating mechanism, and conveyed to a folding mechanism 30 where each one of the four longitudinal edges of the cover material 6 are sequentially folded over either the adjacent perimeter edges of the opposed panels 2 and the centrally positioned spine 4 or the adjacent perimeter side of one of the opposed panels 2, to provide a desired fold, e.g. a standard corner fold (FIG. 1B) or a library corner fold (FIG. 1C), for each one of the four corner regions of the exterior hard book cover 8.

Once such folding is successfully completed by the apparatus for manufacturing hard book covers 20, the conveying and rotating mechanism 28 then reconveys the formed exterior hard book cover 8 to a lower second pressure nip 32, formed by a lower second pair of pressure rollers (the intermediate roller 23 and a lower most third roller 25), located adjacent the infeed table assembly 22, and the formed exterior hard book cover 8 is finally discharged out from the second pressure nip 32 to either the operator or into a collection bin (not shown) located underneath the infeed table assembly 22. The conveying and rotating mechanism 28 is then available to grasp and convey another hard book cover assembly 16 to the folding mechanism 30 for processing of another exterior hard book cover 8.

Now that a brief overview of the apparatus for manufacturing hard book covers 20 has been provided, a detailed description concerning each of the individual components, to facilitate production of exterior hard book cover 8 according to the present invention, will now be provided. As can been seen in FIGS. 2–7, the framework 34 of the apparatus for manufacturing hard book covers 20 comprises four legs, supported on a ground surface or floor S by conventional adjustable height supports 35, as well as a plurality of cross members. The framework 34 supports a pair of spaced apart and parallel extending table assembly shafts 36. The infeed table assembly 22 is, in turn, supported by and slidably movable via conventional bearings along the pair of parallel extending table assembly shafts 36 in a customary fashion. The infeed table assembly 22 is conveyable to and fro along the pair of shafts 36 via a table drive motor 40, supported by one of the table assembly shafts 36. The table drive motor 40 rotates a supported gear (not shown in detail) and the supported gear, in turn, engages with a mating rack (not shown in detail) carried by an under surface of the infeed table assembly 22. Rotation of the supported gear causes the mating rack and the coupled infeed table assembly 22 to move to and fro along the pair of shafts 36 relative to the table drive motor 40. The table drive motor 40 is coupled to a computer 33, in a conventional manner, to control desired motion of the infeed table assembly 22.

A leading edge 41 of the infeed table assembly 22 cooperates with a pneumatically retractable starting gate 42 (see FIGS. 4–7). The starting gate 42 is supported by the framework 34 of the apparatus for manufacturing hard book covers 20. The starting gate 42 is pivotable, via a conventional pneumatic control supplied by the computer 33 but not shown in detail, from a vertically aligned operative position (shown in FIGS. 4 and 5) to an inclined retracted position (shown in FIG. 7) in which the starting gate 42 is rotated about 45 degrees or so, relative to the infeed table assembly 22, toward the conveying and rotating mechanism 28 and sufficiently retracted away from the infeed table assembly 22 to expose a leading edge of the hard book cover assembly 16 and facilitate gripping of the exposed leading edge by the first pressure nip 26.

An upwardly facing surface 43 of the starting gate 42 carries a longitudinal alignment surface 46 against which a leading edge of the pre-glued cover material 6 abuts during the initial set up of the manufacturing process. Once this occurs, the pair of retractable gage blocks 24, supported by the framework 34, are lowered by a pneumatic actuator (not shown) into engagement with an upwardly facing surface of the cover material 6. As is conventional in the art, a top surface of the infeed table assembly 22 has a plurality of spaced apart vacuum ports which maintains a placed position of the cover material 6 thereon following lowering of the gage blocks 24.

The pneumatic actuator of the gage blocks 24 is coupled to the computer 33 to control the raising and lowering operation of the gage blocks 24. The gage blocks 24 have a suitable width to facilitate desired spacing of the pair of opposed panels 2 from opposed longitudinal edges of the spine 4. It is to be appreciated that the spacing between the opposed panels 2 and the width of the spine 4 can vary depending upon the thickness of the exterior hard book cover 8 to be manufactured.

As is conventional in the prior art, the gage blocks 24 are designed such that relative movement of one of the gage blocks 24 results in a corresponding movement of the other gage block 24 relative to a central longitudinal axis L extending longitudinally along the apparatus for manufacturing hard book covers 20. The spine 4 is centrally positioned along the central longitudinal axis L, centered between the two gage blocks 24, and each opposed panel 2 is spaced an identical distance from the central longitudinal axis L (see FIG. 4).

The gage blocks 24 preferably have a width dimension of between about ¼ to about ¾ of an inch, and more preferably a width of between about ⅜ to about ⅝ of an inch which facilitates accurate spacing of both of the opposed panels 2 from the centrally located spine 4. In some applications, it is desirable to increase the spacing distance of both of the opposed panels 2 from the centrally located spine 4. To facilitate this, a top surface of each one of the gage blocks 24 is provided with a screw (not shown in detail). The screw facilitates receipt and support of an adapter (not shown), for each one of the gage blocks 24, to facilitate a wider spacing of each of the opposed panels 2 from the centrally located spine 4. As the gage blocks 24 as well as their spacing feature is conventional and well known in the art, a further detailed description concerning the same is not provided.

Figure 7:
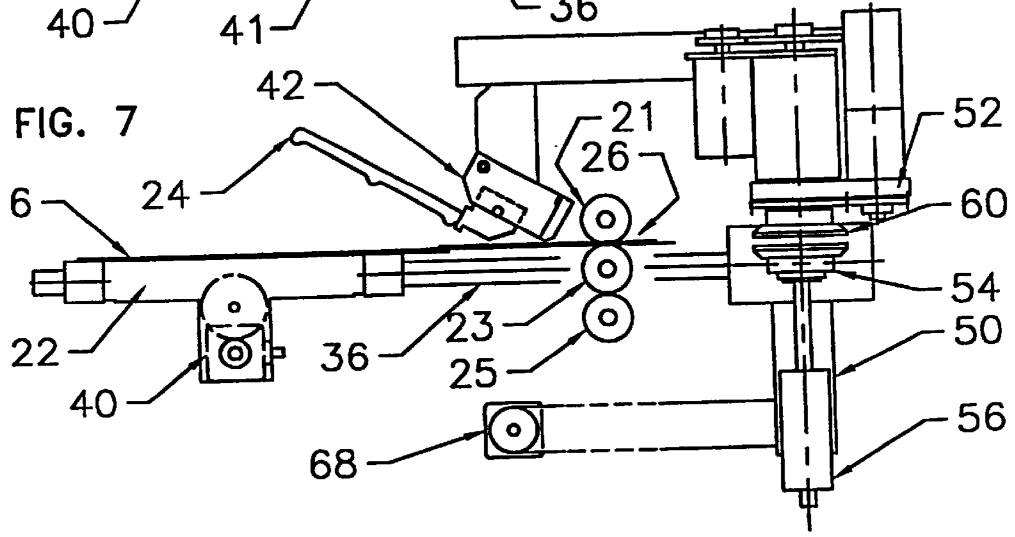
FIG. 7 is a diagrammatic cross-sectional partial view showing initial feeding of the hard book cover assembly from the infeed table assembly.
Figure 8:
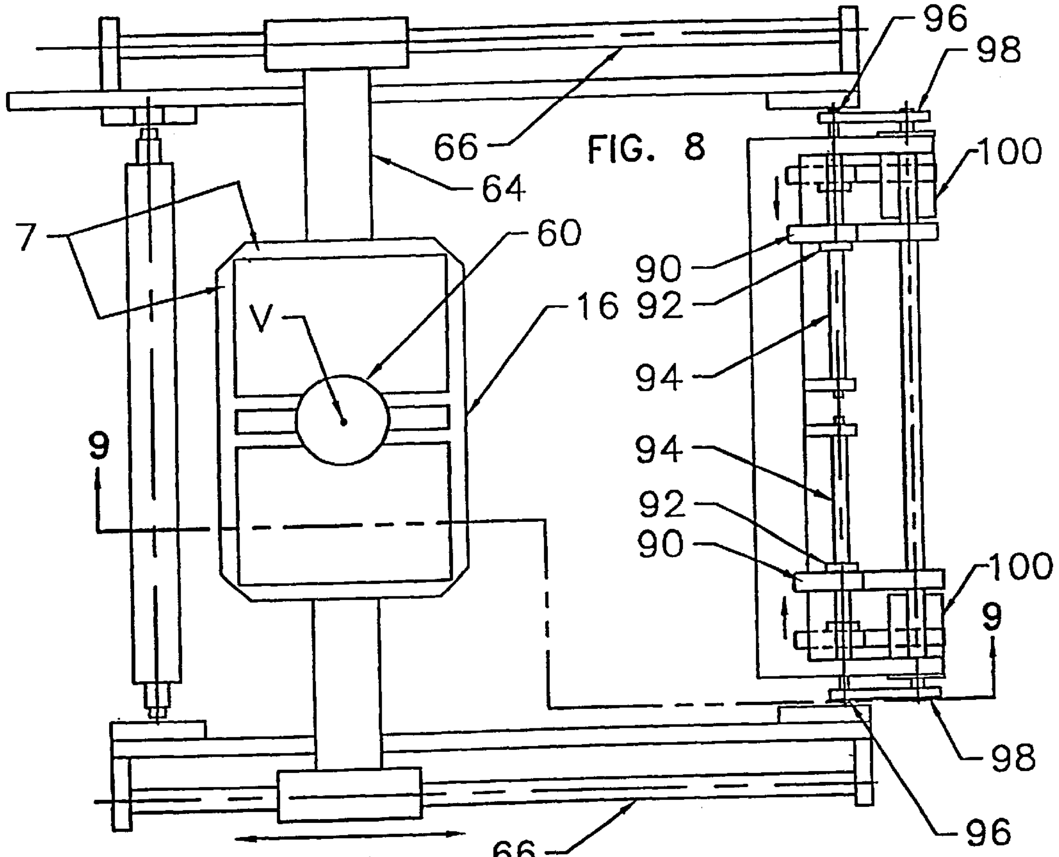
FIG. 8 is a diagrammatic partial top plan view of the combined platen assembly with a majority of the components of the upper platen assembly eliminated for the sake of clarity.

Once the centrally positioned spine 4 and the opposed panels 2 are suitably positioned on the top surface of the pre-glued cover material 6 (see FIG. 4), the gage blocks 24 can then be retracted and pivoted upward away from and out of engagement with the hard book cover assembly 16, to the position shown in FIG. 7, via the computer 33 controlling operation of the pneumatic actuator. In addition, the starting gate 42 is also pivotally retracted (i.e. rotated upwardly and away from the lead edge 41 of the infeed table assembly 22), via the computer 33, so that the leading edge of the hard book cover assembly 16 is exposed and sufficiently protrudes, e.g. protrudes about 1 ½ inches or so, from the leading edge 41 of the infeed table assembly 22 to facilitate gripping thereof.

Figure 6:
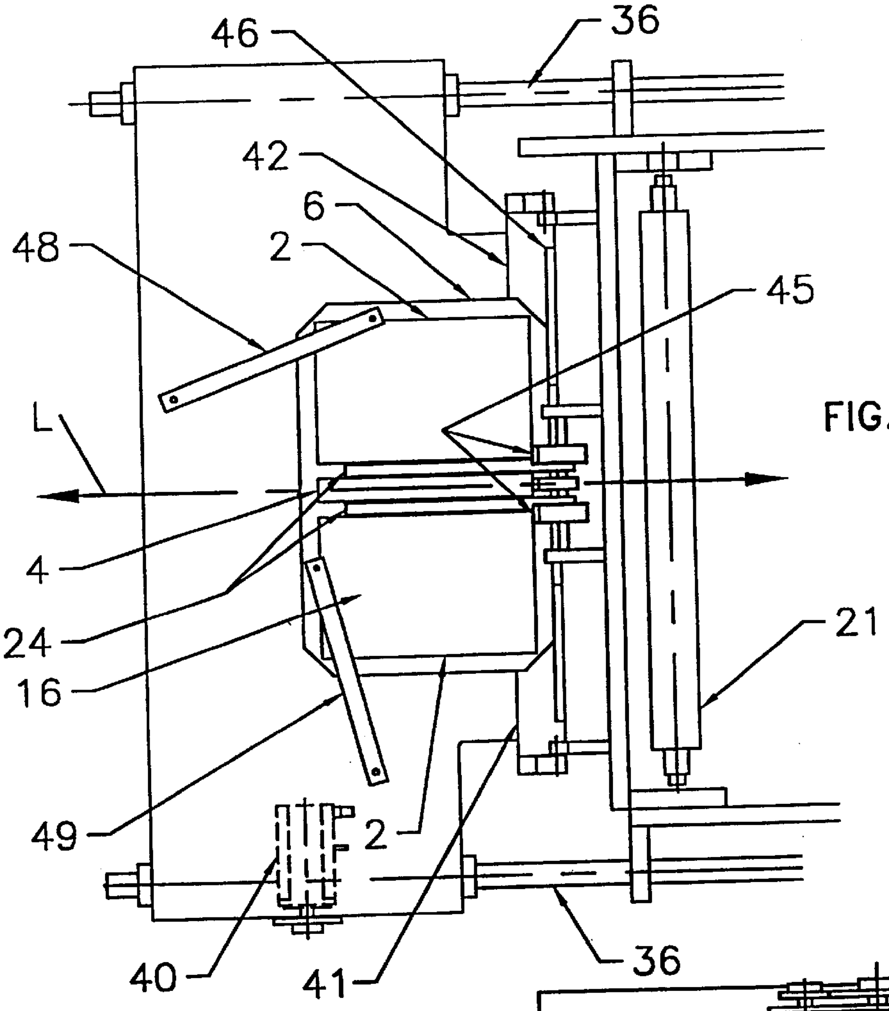
FIG. 6 is a diagrammatic partial top plan view showing the pivoted in use position of the sizing arms to determine the height and the width of the exterior hard book cover to be manufactured by the apparatus of the present invention.

Prior to starting the apparatus for manufacturing hard book covers 20, a first and second sizing arms 48, 49 are pivoted about their respective pivot axes (from the positions shown in FIG. 4) into engagement with a respective one of the opposed panels 2 as shown in FIG. 6. The first sizing arm 48 measures a distance of one of the longitudinal edges of one of the opposed panels 2 from the central longitudinal axis L of the apparatus to determine a width of the exterior hard book cover 8 to be manufactured, while the second sizing arm 49 measures a distance of one of the transverse edges of one of the opposed panels 2 from an alignment surface 45, formed on the gage blocks 24, to determine a height of the exterior hard book cover 8 to be manufactured. Both of the first and the second sizing arms 48, 49 are each connected to a respective encoder (not shown in detail) and both encoders are electrically coupled to the computer 33, in a known manner, to provide pertinent sizing information concerning the determined width and height of the hard book cover assembly 16 to be folded.

An upward facing surface of the infeed table assembly 22 is provided with a plurality of infeed table assembly vacuum holes (not shown) to facilitate retention of the cover material 6 on the infeed table assembly 22. The computer controls operation of the infeed table assembly vacuum holes.

Once these measurements are taken, the drive table motor 40 is activated to advance the infeed table assembly 22 toward the first pressure nip 26. As this occurs, the upper pair of pressure rollers 21, 23 are rotated by a pressure roller drive 27 to grip the leading edge of the hard book cover assembly 16 (FIG. 7) and facilitate initial adhering of the opposed panels 2 and the centrally positioned spine 4 to the pre-glued cover material 6, without the formation of any wrinkles or creases between those engaged components, as the hard book cover assembly 16 passes through the first pressure nip 26. Once the infeed table assembly 22 sufficiently introduces the leading edge of the hard book cover assembly 16 into the first pressure nip 26, the table drive motor 40 discontinues operation. Thereafter, the rotation of the upper pair of rollers 21, 23, of the first pressure nip 26, solely causes movement of the hard book cover assembly 16 relative to the infeed table assembly 22. It is to be appreciated that the upper pair of pressure rollers 21, 23 are only rotated a desired distance, e.g. a distance equal to one half of the determined height distance of the exterior hard book cover 8 to be manufactured plus a constant, so that the hard book cover assembly 16 is located at a position which is precisely centered with respect to a vertical axis V of the conveying and rotating mechanism 28 so as to be centrally supported by the conveying and rotating mechanism 28.

Figure 9:
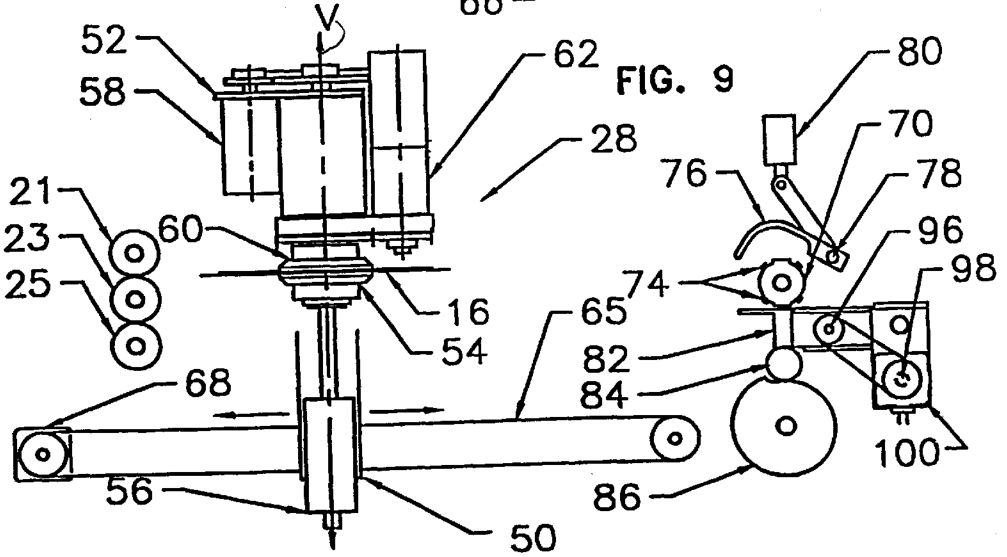
FIG. 9 is a diagrammatic cross-sectional partial view along section line 9—9 of FIG. 8 showing both the upper and lower platen assemblies.
Figure 10:
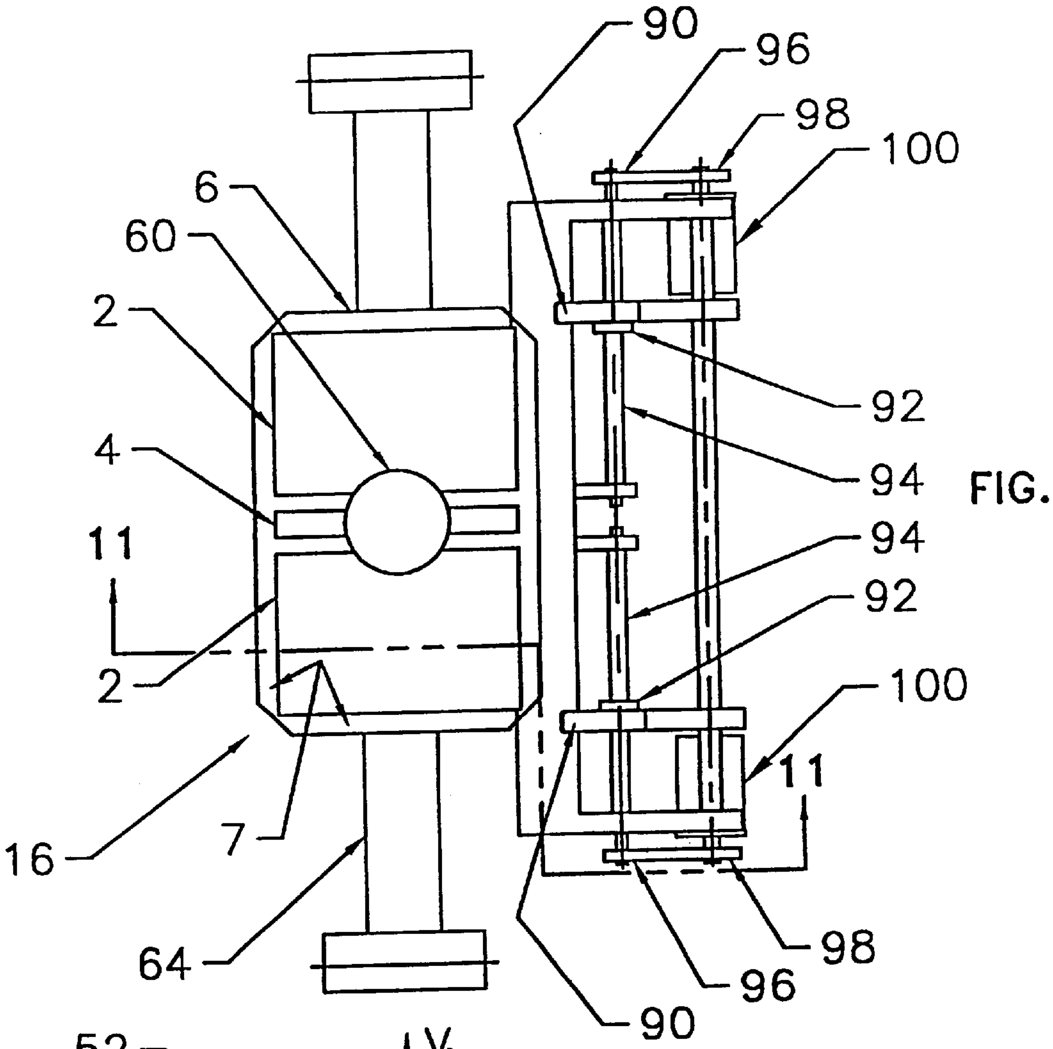
FIG. 10 is a diagrammatic partial top plan view showing an initial position of the hard book cover assembly immediately prior to engagement with the folding mechanism with the brush bar and the pusher fingers removed for the sake of clarity.

The conveying and rotating mechanism 28 generally comprises a pair of upper and lower mating platen assemblies 50, 52 (see FIGS. 2, 7 and 9, for example) that are vertically movable relative to one another to sandwich and grasp the hard book cover assembly 16 therebetween. As can be seen in those Figures, the lower platen assembly 50 generally comprises a lower platen 54 that is movable vertically upwardly and downwardly, by conventional air cylinder 56, coupled to and controlled by the computer C, which is only diagrammatically shown in FIG. 2, and the lower platen 54 is also freely rotatable 360 degrees via internal bearings (not shown).

The upper platen assembly 52 includes a vertical first platen drive motor 58 which facilitates vertical upward and downward movement of the upper platen 60 and a rotatable second platen drive motor 62 which facilitates 360 degree rotation of the upper platen 60, on bearings, which, in turn, causes rotation of the sandwiched hard book cover assembly 16 and the lower platen 54 therewith. The necessity for rotation of the hard book cover assembly 16 will become apparent from the following description of the present invention. Both the vertical first platen drive motor 58 and the rotatable second platen drive motor 62 are coupled to the computer 33 in a conventional fashion to control operation of those motors.

Once the hard book cover assembly 16 is suitably centered with respect to the lower and upper platen assemblies 50, 52, at least one or both of the lower and upper platen assemblies are moved toward one another to sandwich the hard book cover assembly 16 therebetween, i.e. the lower platen 54 is moved vertically upward via the air cylinder 56 and/or the upper platen 60 is moved vertically downward via the first platen drive motor 58. Both the lower and upper platen assemblies 50, 52 in combination with one another are hereafter referred to as the combined platen assembly 51.

All of the components of the combined platen assembly 51 are supported by a platen support structure 64. The platen support structure 64 is, in turn, supported by and slidably movable along a pair of spaced apart platen assembly shafts 66. Opposed ends of the spaced apart platen assembly shafts 66 are supported by the framework 34. The pair of spaced apart platen assembly shafts 66 extend parallel to the spaced apart table assembly shafts 36 supporting the infeed table assembly 22. A platen transfer motor 68 is coupled to the platen support structure 64 by an endless belt 65 to induce desired to and fro motion of the combined platen assembly 51 along the pair of opposed shafts 66 via bearings (not shown) carried by the platen support structure 64. The platen transfer motor 68 supports a pulley which engages with the endless belt 65 and the endless belt 65 is wrapped around a second fixed pulley. The platen support structure 64 is coupled to a top portion of the endless belt 65. Conveyance of the endless belt 65, in a first direction, conveys the platen support structure 64 along the pair of spaced apart platen assembly shafts 66 toward the first and second pressure nips 26 and 32 while rotation of the platen transfer motor 68, in an opposite direction, conveys the support structure 64 toward the folding mechanism 30. The platen transfer motor 68 is coupled to the computer 33 in a conventional fashion to control operation of those motors.

Figure 11:
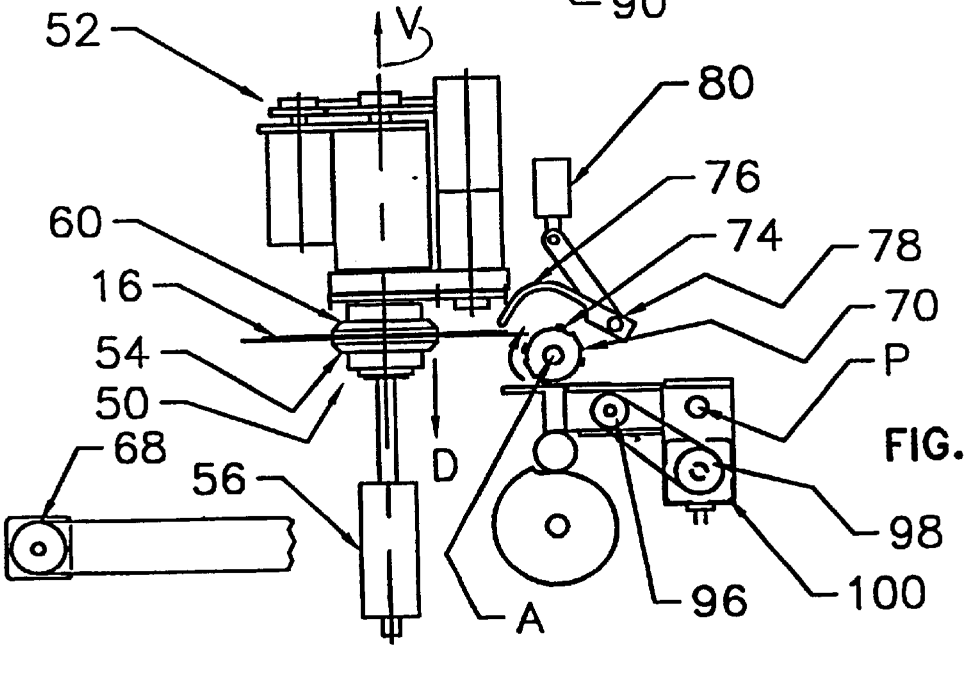
FIG. 11 is a diagrammatic cross-sectional partial view along section line 11—11 of FIG. 10 with the brush bar and the pusher fingers added for clarity.
Figure 12:
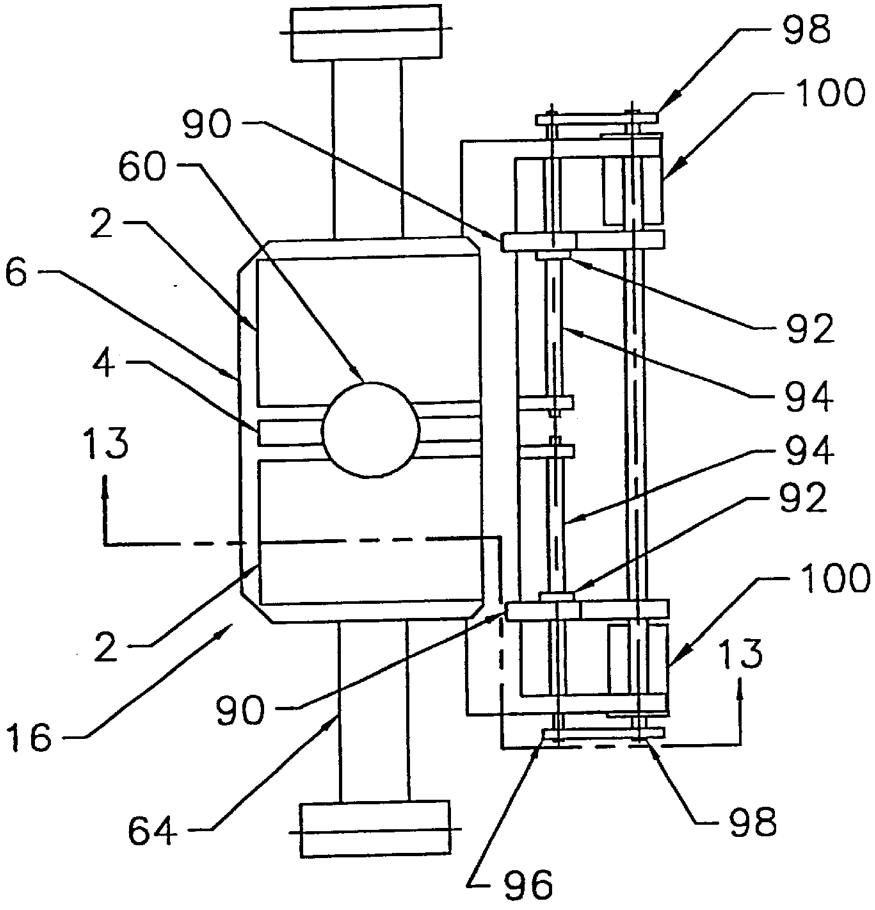
FIG. 12 is a diagrammatic partial top plan view showing an intermediate folding position of the hard book cover assembly following engagement with pressure bar but the brush bar and the pusher fingers are removed for the sake of clarity.

The platen transfer motor 68 causes the platen support structure 64 and the combined platen assembly 51 to be conveyed from an initial operative position, located adjacent the first and second pressure nips 26 and 32 (see FIG. 7), to a remote position located adjacent the folding mechanism 30 (see FIG. 11). During a first portion of such conveyance of the combined platen assembly 51 by the platen transfer motor 68, the pressure roller drive 27 is rotated so that the hard book cover assembly 16 is completely released and discharged from the pair of first rollers 21 and 23 of the first pressure nip 26. As the combined platen assembly 51 is conveyed toward the folding mechanism 30, following complete release of the hard book cover assembly 16 from the first pressure nip 26, the hard book cover assembly 16 can be rotated a desired amount, e.g. zero degrees, 450°, 90°, 135° or 180°.

As the combined platen assembly 51 approaches the folding mechanism 30, the combined platen assembly 51 is positioned so that the leading edge of the panels and the spine are approximately positioned at the vertical tangent of the brush bar 70, as can be seen in FIG. 11. Once the combined platen assembly 51 is in this position, the computer 33 initiates rotation of a brush bar 70 in a clockwise direction, as can be seen in FIG. 11, via control of a brush bar drive 72 electrically coupled to the computer. At the same time, the first platen drive motor 58 of the upper platen assembly 52 is activated to commence a gradual lowering of the combined platen assembly 51, at a rate of about four inches per second in the direction of arrow D, against the biasing force of the air supplied to the air cylinder 56 of the lower platen assembly 50, such that a leading free edge portion 7 of the cover material 6 is brought into engagement with the free ends of the rotating longitudinal brushes 74 carried by the brush bar 70.

According to a preferred form of the present invention, the brush bar has a diameter of about 2 inches and four longitudinally extending brushes 74, each having a radial length of about 3⁄16 to about ¼ inches, are supported about the periphery of the brush bar 70. In addition, each one of the longitudinally extending brushes 74 is located at a position which is 90° with respect to any adjacent longitudinal brush.

To improve the folding action according to the present invention, the apparatus for manufacturing hard book covers 20 further includes a plurality of downwardly curved pusher fingers 76 which are all fixedly supported on a pivotal longitudinal shaft 78. The longitudinal shaft 78 is supported by the framework 34 in a pivotable manner. A pusher actuator 80, which is preferably pneumatically operated and coupled to the computer 33, is linked to the longitudinal shaft 78 via an arm (not labeled) to facilitate simultaneous operation of all of the pusher fingers when a fold is occurring. The pusher actuator 80 is coupled to the computer 33 to control operation of the pusher fingers 76.

As the combined platen assembly 51 initially commences its downward vertical movement, the pusher fingers 76 are pivoted into position so that they support top longitudinal edge areas of the opposed panels 2 and the centrally positioned spine 4 and prevent those supported areas of the panels 2 and the spine 4 from being deflected upward, by rotation of the longitudinal brushes 74 of the brush bar 70, and thereby ensure an acceptable fold of the cover material 6 over the adjacent edges of the spine 4 and the panels 2 is achieved.

Due to the vertical lowering motion of the hard book cover assembly 16 in the direction of arrow D, via the combined platen assembly 51, relative to the brush bar 70, as well as the clockwise rotation of the brush bar 70, the leading free edge portion 7 of the cover material 6 is brushed so as to be vertically aligned against a narrow vertical wall 104 (see FIGS. 22 and 25) of the centrally positioned spine 4 and narrow vertical surfaces 104 of the pair of opposed panels 2 so that the free edge portion 7 of the cover material 6 is partially folded over the panels 2 and the spine 4 and the rotating longitudinal brushes 74 eliminate the formation of any undesired folds or creases in the cover material 6 as the cover material 6 is folded over the vertical edges of the panels 2 and the spine 4.

Figure 13:
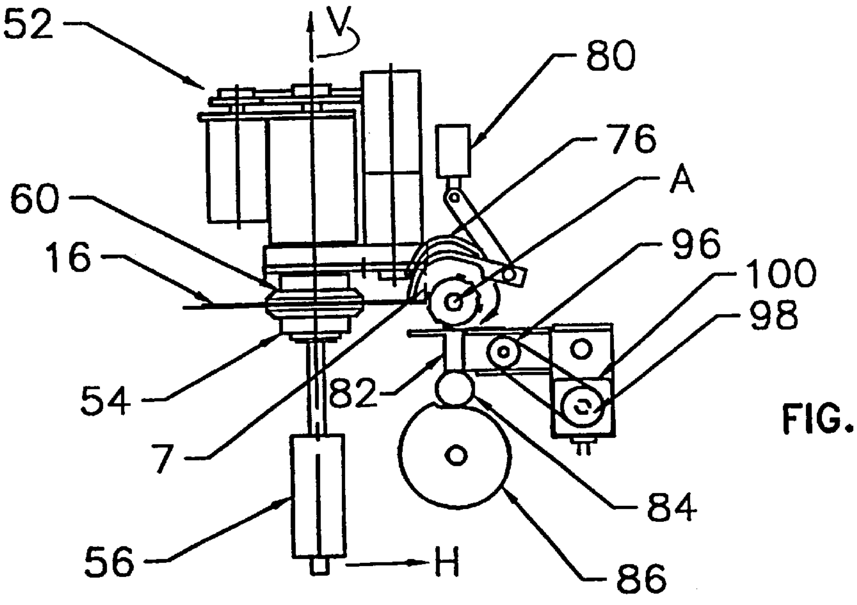
FIG. 13 is a diagrammatic cross-sectional partial view along section line 13—13 of FIG. 12 with the brush bar and the pusher fingers added for clarity.
Figure 14:
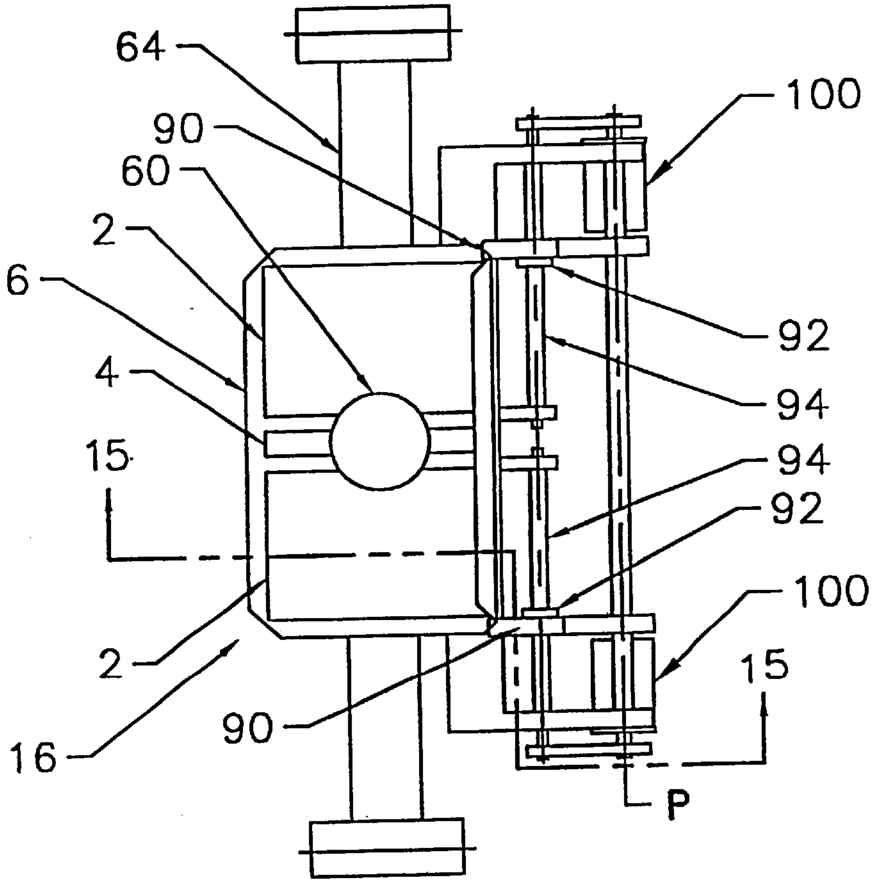
FIG. 14 is a diagrammatic partial top plan view showing the final vertically lowered and horizontally displaced position of the hard book cover assembly prior to pressing by the fold mechanism with the brush bar and the pusher fingers removed for the sake of clarity.

Once the combined platen assembly 51 is vertically lowered a sufficient distance so as to coincide with a central longitudinal axis A of the brush bar 70, the free edge portion 7 of the cover material 6 is oriented substantially vertical, as can be seen in FIG. 13, such that a portion of the cover material 6 is engaged with and extends along the narrow vertical surfaces 104 of the opposed panels 2 and the spine 4.

The combined platen assembly 51 then continues its vertical downward movement and the combined platen assembly 51 also simultaneously commences a horizontal movement in a direction toward the brush bar 70 as indicated by arrow H. The simultaneous vertical downward and horizontal movement of the combined platen assembly 51 is designed so as to induce a curved motion on the hard book cover assembly 16 which essentially approximates the exterior contour of the brush bar 70 to maintain the longitudinal brushes 74 of the brush bar 70 in continuous brushing engagement and contact with the free edge portion 7 of the cover material 6 to be folded to facilitate a tight and crease-free fold of the remaining portion of the free edge of the cover material 6, over the adjacent longitudinal edge of the opposed panels 2, and the centrally positioned spine 4, as can be seen in FIG. 15.

During the entire folding process, the pusher fingers 76 are controlled by the computer 33 to move a corresponding downward distance and closely follow the exterior contour of the brush bar 70 as the hard book cover assembly 16 is moved by the combined platen assembly 51. Thus, the pusher fingers 76 continuously support the panels 2 and the spine 4 and prevent undesired excessive deflection thereof from the clockwise rotation of the longitudinal brushes 74 of the brush bar 70.

Figure 15:
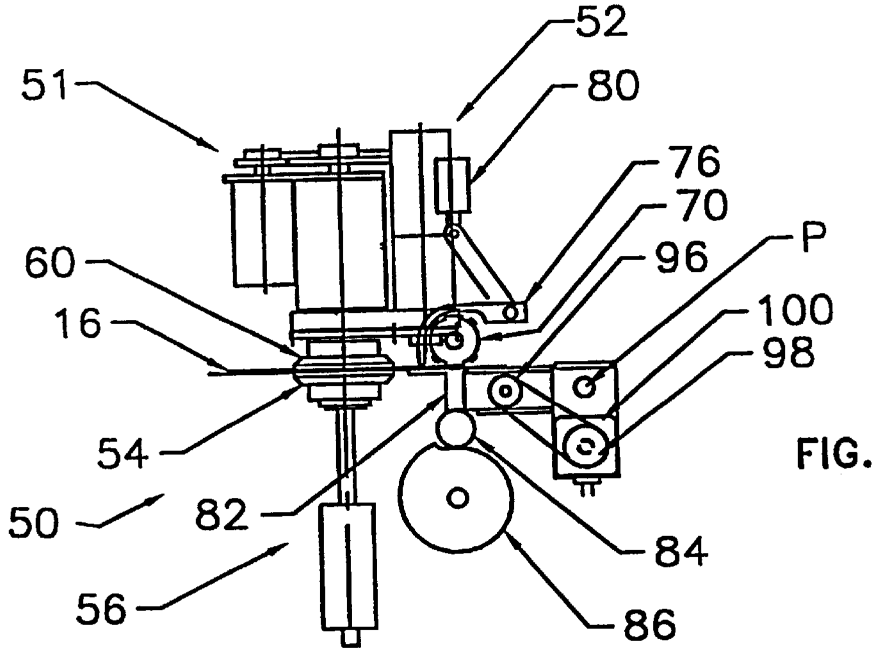
FIG. 15 is a diagrammatic cross-sectional partial view along section line 15—15 of FIG. 14 with the brush bar and the pusher fingers added for clarity.
Figure 16:
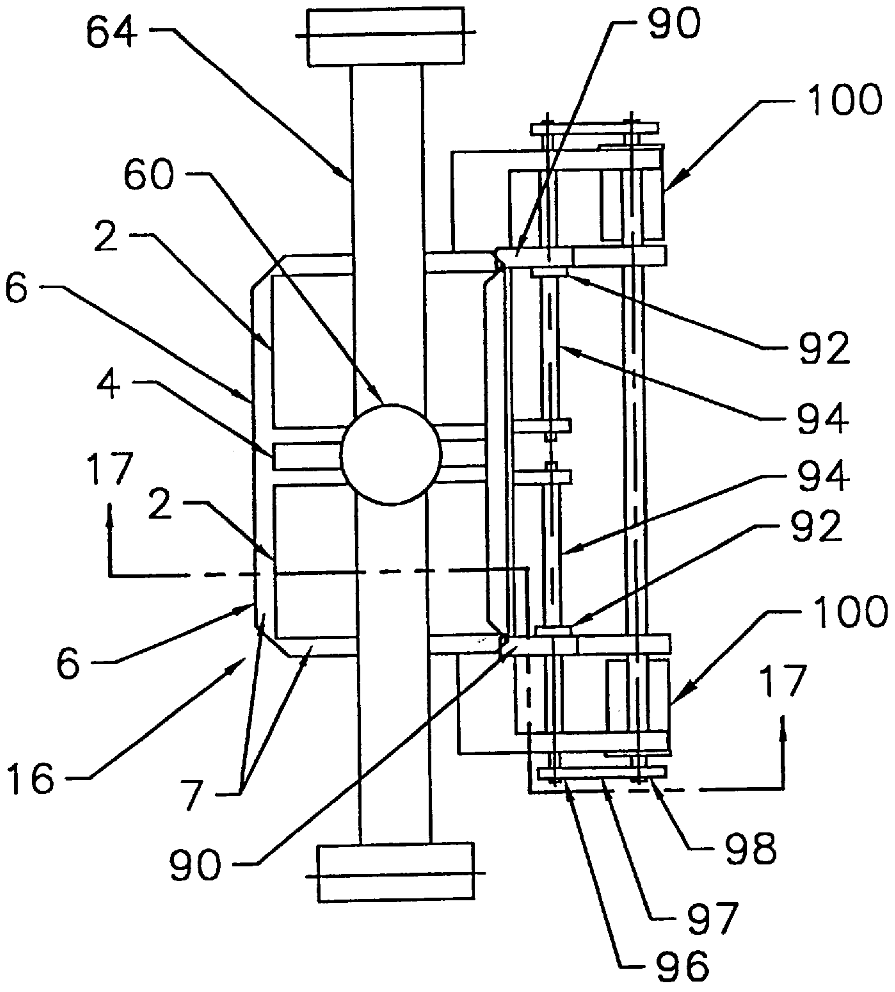
FIG. 16 is a diagrammatic partial top plan view showing a final pressed position of the hard cover book assembly by the fold mechanism with the brush bar and the pusher fingers removed for the sake of clarity.
Figure 17:
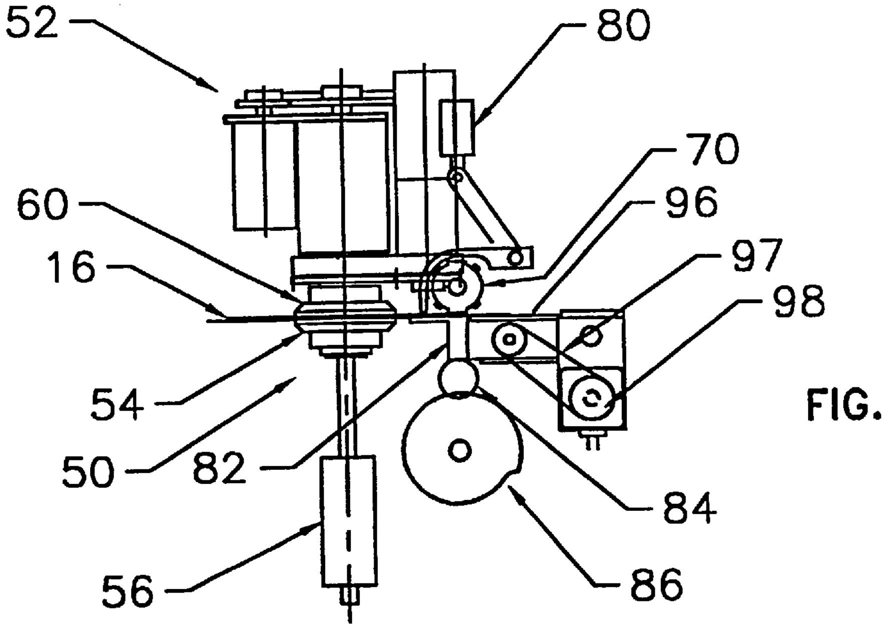
FIG. 17 is a diagrammatic cross-sectional partial view along section line 17—17 of FIG. 16 with the brush bar and the pusher fingers added for clarity.

The final positions of the brush bar 70 and the combined platen assembly 51 are shown in FIG. 15. As can be seen in FIG. 15, the leading edge of the hard book cover assembly 16 just folded is located between an undersurface of the brush bar 70 and an upwardly facing surface of a pressure bar 82. The pressure bar 82 is supported by the framework 34 and pivots about pivot axis P. The pressure bar 82 forms part of the folding mechanism 30 and a lower portion of the pressure bar 82 carries a rotatable cylindrical roller 84 which engages with a mating cam member 86. For the sake of clarity, both the rotatable cylindrical roller 84 and the mating cam member 86 are rotated 90 degrees (in the drawings) so that the operation of those components can be more easily understood.

The cam member 86 is a constant cam component which is coupled to be driven by a cam motor 88 which is coupled to the computer C. As the cam member 86 is driven in a first rotational direction by the cam motor 88 (counter-clockwise as seen in FIG. 15), the pressure bar 82 is moved vertically upward toward the brush bar 70 to provide a desired clamping action to the just folded hard book cover assembly located between the brush bar 70 and the pressure bar 82. Alternatively, when the cam motor 88 is rotated in the opposite direction (clockwise as seen in FIG. 15), the pressure bar 82 is moved vertically downward away from the brush bar 70 to relieve the clamping action to the just folded hard book cover assembly and facilitate release thereof from the folding mechanism 30.

According to a preferred form of the present invention, the cam motor 88 will provide a desired pressure to the just folded hard book cover assembly. That is, the cam motor 88 is designed to cease rotation once a sufficient torque is applied to the just folded hard book cover assembly thereby preventing further rotational motion from being supplied to the cam member 86. It is to be appreciated that it is only necessary to provide sufficient pressure to adhere adequately the folded cover material 6 to the edge portions of one of the opposed panels 2 and/or the edge portions of the opposed panels 2 and the centrally positioned spine 4.

Prior to actuation of the cam motor 88, the computer 33 controls operation of the brush bar drive 72 to rotate the brush bar 70 so that a brush bar clamping pad 75, supported by the brush bar 70, is located immediately adjacent and facing the pressure bar 82 (see FIGS. 15 and 21) so as to sandwich the just folded hard book cover assembly between the brush bar 70 and pressure bar 82. The brush bar clamping pad 75 is an elongate relatively soft pad member having a thickness of about ¼ inch to about ⅜ inch or so. During the sandwich process, the bush bar clamping pad 75 will closely and intimately follow the contour of the folded cover material 6.

In order to achieve a superior tuck for a standard corner fold (FIG. 1B) according to the present invention, the folding mechanism 30 includes a pair of opposed tuck fingers 90 and reference will now be had to FIGS. 16–25 for a further discussion of the tuck fingers 90. The pair of opposed tuck fingers 90 are located on opposite sides of the just folded hard book cover assembly 16 and are spaced from one another by a sufficient distance to allow the cover assembly 16 to be closely accommodated and sandwiched between a downwardly facing surface of the brush bar clamp pad 75 and an upwardly facing surface of the pressure bar 82 as well as between inwardly facing surfaces of the pair of opposed tuck fingers 90 (see FIG. 16). The pair of opposed tuck fingers 90 are preferably elongate members or springs, having a width of about ¾ inches and a thickness of about 0.030 of an inch, which are vertically spaced from a top surface of the pressure bar 82 so as to provide a sufficient tucking or nicking force to the partially folded cover material 6 and/or perimeter vertical edge portions of the opposed panels 2. The inwardly facing corner, of each of the tuck fingers 90, is curved like a ski tip to facilitate sliding of the tuck fingers 90 over the folded over cover material 6 (see FIG. 20).

An opposed end of each one of the pair of opposed tuck fingers 90 is connected to a drive nut 92 which threadingly engages with an elongate lead screw 94. A remote end of each lead screw supports a pulley 96 and that supported pulley 96 is coupled, via a conventional drive belt 97, to a mating pulley 98 supported by a drive shaft driven by a tuck motor 100. By this arrangement, simultaneous rotation of each of the tuck motors 100, in a first rotational drive direction, causes rotation of the lead screws 94. Such rotation causes the drive nuts 92 and the associated tuck fingers 90 to be traversed in a desired direction along the length of the lead screws 94, depending upon the rotational direction of the lead screws 94. Each one of the tuck fingers 90 has a similar arrangement and both the tuck motors 100 are coupled to the computer 33 to control simultaneous operation of both of the tuck fingers 90. It is to be appreciated that a single tuck motor can be coupled to a single lead screw 94 (with left and right threads), supporting both of the drive nuts 92 and the associated tuck fingers 90, such that actuation of the lead screw in a first direction causes simultaneous inward movement of both of the tuck fingers 90 and actuation of the lead screw in the opposite direction causes simultaneous outward movement of both of the tuck fingers 90.

Figure 1A:
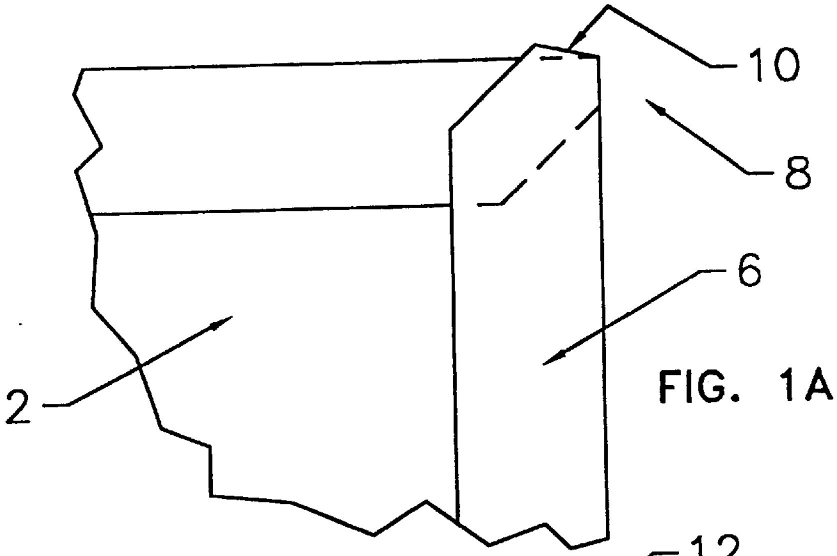
FIG. 1A is a partial diagrammatic top plan view showing a corner region of an inwardly facing surface of a hard book cover with an unacceptable cover material standard corner fold.
Figure 1B:
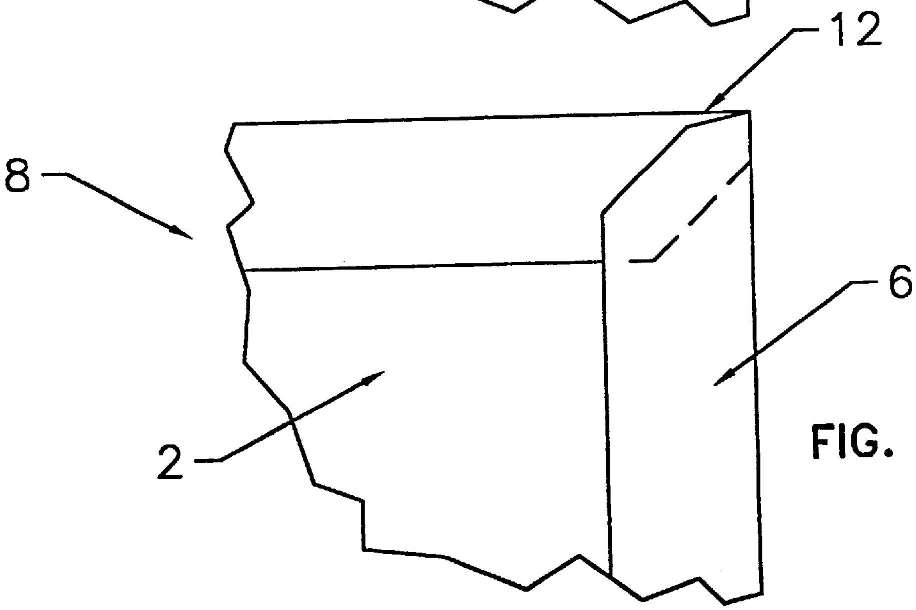
FIG. 1B is a partial diagrammatic top plan view showing a corner region of an inwardly facing surface of a hard book coverwith an acceptable cover material standard corner fold.
Figure 1C:
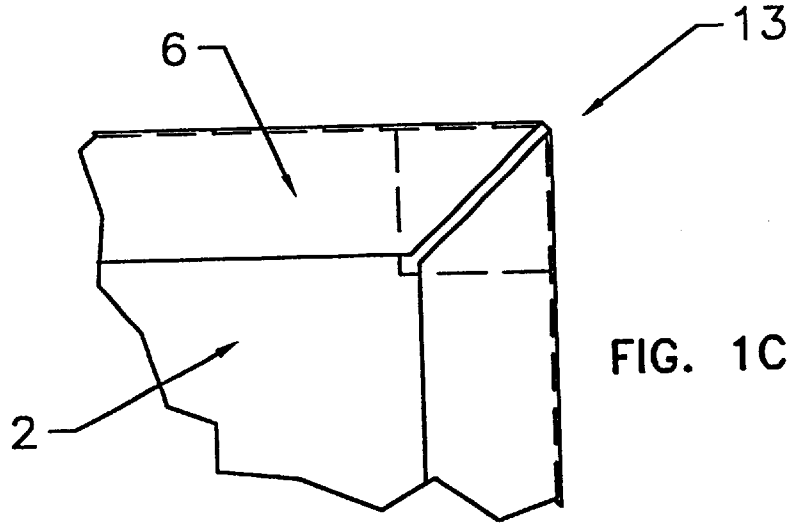
FIG. 1C is a partial diagrammatic top plan view showing a corner region of an inwardly facing surface of a hard book cover with an acceptable cover material library corner fold.

As can be seen in FIGS. 18 and 20, the folded over free end portion 7 of the cover material 6 is folded along a longitudinal top edge of one of the panels 2, but a triangular shaped region 102 of the folded over free end portion 7 (see the triangular shaded area of those Figures) extends past and is not engaged with the panel 2. It is this triangular shaped region 102 that must be adequately tucked in order to avoid the formation of an unsightly dog-eared fold, as shown in FIG. 1A. Once one of the tuck fingers 90 is moved inwardly toward the narrow vertical wall 104 of the panel 2 to cause this triangular shaped region 102 of the free end of the cover material 6 to be biased against the narrow vertical wall 104 of the panel 2 as well as to be brought into engagement with an upwardly facing surface of the cover material 6 so that the triangular shaped region 102 closely follows the exterior contour of the panel 2. Due to such tucking action (see FIG. 23), the excess cover material 6 is biased against the narrow vertical wall 104 of the panel 2 as well as biased into engagement with an opposed upwardly facing surface of the cover material 6 so that when the adjacent transverse longitudinal edge is subsequently folded, the cover material 6 will not bunch up in this region and result in the formation of an unsightly dog-eared fold, i.e. all the excess cover material 6 is neatly and tightly folded against and closely follows and conforms to the exterior contour of the perimeter edge portion of the panel 2 to result in a sufficiently tight fold when that transverse edge is subsequently folded by the apparatus for manufacturing hard book covers 20.

It is to be noted that the computer 33 initial sets the tuck fingers 90 to a desired spacing from one another and such desired spacing is defined by the width determined by the first sizing arm 48, i.e. the tuck fingers spacing from one another is equal to the determined width plus ⅛ of an inch. Due to this initial preset tuck finger spacing, the tuck fingers are positioned to facilitate an initial folding of the hard book cover assembly 16 as the hard book cover assembly 16 is received by the fold mechanism (see FIG. 20). Consequently, only a small inward jog of the two tuck fingers 90 by a combined distance of about ⅛ is subsequently necessary to complete the tucking of the cover material (see FIG. 23).

It is to be appreciated that before the cam motor 88 is rotated in the drive direction to release the clamping force applied to the just folded hard book cover assembly, located between the brush bar 70 and the pressure bar 82, the tuck fingers 90 are indexed or jogged toward one another a slight distance, e.g. they are indexed by a distance of at least about 1/16 inch, more preferably indexed at least about ⅛ inch. Such jogging or indexing of the tuck fingers 90, toward one another, facilitates a superior tucking or nicking of the cover material 6 relative to the opposed longitudinal edges of the panels 2. This tucking or nicking motion ensures that the cover material 6 closely follows the exterior contour of the opposed panels 2, especially the narrow vertical wall 104 of the panel 2 adjacent the corner region (see FIGS. 23 and 25), so that when the transverse unfolded edges of the panels 2 are subsequently folded, during a subsequent folding procedure, the cover material 6 will be folded in a manner to achieve a standard corner fold similar to that shown by element 12 in FIG. 1B, which is acceptable and desirable, while the standard corner fold shown by element 10 of FIG. 1A is unacceptable and undesirable and generally results from an inadequate tucking or nicking of the cover material 6 prior to creating the second fold.

In a preferred form of the present invention, each one of the tuck fingers 90 is a spring member which is biased toward the pressure bar 82 but is sufficiently spaced from the pressure bar 82 by a desired distance, i.e. is spaced therefrom by a distance which is between about two to three times the thickness of the employed cover material 6. Such spacing ensures that when the cover material 6 is folded over itself to result in an overlapped dual thickness fold of material, the tuck fingers 90 will still be slightly spaced from the folded over cover material 6. However, the downwardly facing surface of the brush bar clamp pad 75 engages with an upwardly facing top surface of each one of the tuck fingers 90 to suitably bias the free unsupported ends of the tuck fingers 90 vertically downward into engagement with the folded over and overlapped dual thickness of cover material 6 and result in the desired tuck fold (see FIGS. 23 and 25). It is to be appreciated that only a minimal amount of pressure is required to sufficiently tuck the folded over and overlapped dual thickness cover material 6 due to the adhesive characteristics of the glue carried by the abutting surfaces of the cover material 6.

Once the first longitudinal edge of the hard book cover assembly 16 is completely folded, i.e. a longitudinal edge of the book cover assembly formed by the two opposed panels 2 and the centrally positioned spine 4, the cam motor 88 is reversed to lower vertically downward the pressure pad 82 a sufficient distance away from the brush bar clamp pad 75, e.g. to create a space therebetween of about ¼ of an inch, and the combined platen assembly 51 is then moved horizontally away from the folding mechanism 30. During this retraction motion, the combined platen assembly 51 will be sufficiently retracted away from the folding mechanism 30 to facilitate rotation of the partially folded hard book cover assembly 16, 180 degrees, so that the opposite longitudinal edge of the hard book cover assembly 16 is then positioned adjacent and facing the folding mechanism 30 and is elevated back to its initial position located adjacent the fold mechanism (see FIG. 11). Thereafter, the above procedure is again repeated for the second opposed longitudinal edge of the partially folded hard book cover assembly 16 so that the remaining two corner regions of the exterior hard book cover 8 are suitably folded and tucked or nicked as described above.

Once this has occurred, the combined platen assembly 51 will again be sufficiently retracted away from the folding mechanism 30 to facilitate rotation of the partially folded hard book cover assembly 16, preferably 90 degrees this time, so that an adjacent transverse longitudinal edge of the hard book cover assembly 16 is then positioned adjacent and facing the folding mechanism 30, as shown in FIG. 11. Thereafter, the above procedure is again repeated for the transverse edge of the partially folded hard book cover assembly 16 so that this transverse edge is also suitably folded as described above. The inward indexing or jogging of the tuck fingers 90 is not required for this fold.

Finally, the combined platen assembly 51 will again be sufficiently retracted away from the folding mechanism 30 to facilitate rotation of the partially folded hard book cover assembly 16, 180 degrees this time, so that the opposed transverse longitudinal edge of the hard book cover assembly 16 is then positioned adjacent and facing the folding mechanism 30. Thereafter, the above procedure is again repeated for the second transverse edge of the partially folded hard book cover assembly 16 so that this last transverse edge is suitably folded, as described above. The inward indexing or jogging of the tuck fingers 90 is also not required for this fold. By the above procedure, all four edges (the two longitudinal edges and the two transverse edges) of the hard book cover assembly are folded and adequately tucked by the apparatus for manufacturing hard book covers 20.

Once all four longitudinal perimeter edges of the hard book cover assembly 16 are sufficiently folded, the conveying and combined platen, assembly 51 is then reconveyed back to its initial position (see FIG. 2), at a slightly lowered vertical orientation, so that the completely folded cover assembly is received by and fed into the second pressure nip 32, formed by the intermediate roller 23 and the third roller 25. The lower and upper mating platen assemblies 50, 52 separate from one another and the pressure roller drive 27 is then activated, by the computer 33, so that the second pressure nip 32 is rotated to convey the completely folded cover assembly to either the operator or a collection bin (not shown), preferably positioned beneath the infeed table assembly 22, while a subsequent hard book cover assembly 16, prepared by an operator, may possibly be simultaneously fed by the first pressure nip 26 so that the combined platen assembly 51 may receive, grasp and suitably fold an additional hard book cover assembly 16, via the folding mechanism 30, by repeating the entire above discussed procedure.

The apparatus, of the present invention, is also suitable for forming library corner folds and the folding procedure is as follows. The opposed panels 2 and the centrally positioned spine 4 are position on the cover material 6, substantially the same as for a standard corner, and fed and grasped by the combined platen assembly 51. As the combined platen assembly 51 is conveyed toward the folding mechanism 30, following complete release of the hard book cover assembly 16 from the first pressure nip 26, the hard book cover assembly 16 is rotated a desired amount, e.g. generally either 45° or 135°.

As the combined platen assembly 51 approaches the folding mechanism 30, the combined platen assembly 51 is positioned so a first corner region of the hard book cover assembly 16 is only folded in a manner similar to that described above, but without any tucking action being provided by the tuck fingers. Following folding of the corner region, the combined platen assembly 51 is then moved horizontally away from the folding mechanism 30. During this retraction motion, the combined platen assembly 51 will be sufficiently retracted away from the folding mechanism 30 to facilitate rotation of the partially folded hard book cover assembly 16, 90 degrees, so that an adjacent corner region of the hard book cover assembly 16 is then positioned adjacent and facing the folding mechanism 30 and is elevated back to its initial position located adjacent the fold mechanism (see FIG. 11). Thereafter, the above procedure is sequentially repeated for the second corner region, the third corner region and the fourth corner region of the partially folded hard book cover assembly 16 so that all four corners regions of the exterior hard book cover 8 are suitably folded.

Following folding of all four corner regions, the combined platen assembly 51 is then moved horizontally away from the folding mechanism 30. During this retraction motion, the combined platen assembly 51 will be sufficiently retracted away from the folding mechanism 30 to facilitate rotation of the partially folded hard book cover assembly 16, 45 degrees, so that a first edge of the hard book cover assembly 16 is then positioned adjacent and facing the folding mechanism 30 and is elevated back to its initial position located adjacent the fold mechanism (see FIG. 11).

Once the first longitudinal edge of the hard book cover assembly 16 is completely folded, similar to the procedure described with respect to standard corners but without any tucking action being provided by the tuck fingers 90, the combined platen assembly 51 is then moved horizontally away from the folding mechanism 30. During this retraction motion, the combined platen assembly 51 will be sufficiently retracted away from the folding mechanism 30 to facilitate rotation of the partially folded hard book cover assembly 16, 90 degrees, so that a second edge of the hard book cover assembly 16 is then positioned adjacent and facing the folding mechanism 30 and is elevated back to its initial position, located adjacent the fold mechanism (see FIG. 11). Thereafter, the above procedure is again repeated for the third and fourth edges of the partially hard book cover assembly 16, whereby all four corners and edges (the four corners and the two longitudinal edges and the two transverse edges) of the hard book cover assembly are folded by the apparatus for manufacturing hard book covers 20.

Once all four longitudinal perimeter edges of the hard book cover assembly 16 are sufficiently folded, the combined platen assembly 51 is then reconveyed back to its initial position (see FIG. 2), at a slightly lowered vertical orientation, so that the completely folded cover assembly is received by and fed into the second pressure nip 32, formed by the intermediate roller 23 and the third roller 25. The lower and upper mating platen assemblies 50, 52 separate from one another and the pressure roller drive 27 is then activated, by the computer 33, so that the second pressure nip 32 is rotated to convey the completely folded cover assembly to either the operator or a collection bin (not shown), preferably positioned beneath the infeed table assembly 22. Thereafter, a subsequent hard book cover assembly 16, prepared by an operator, may be feed by the first pressure nip 26 so that the combined platen assembly 51 may receive and suitably fold an additional hard book cover assembly 16, via the folding mechanism 30, by repeating the above discussed procedure.

The table drive motor 40, the pressure roller drive 27, the first platen drive motor 58, the second platen drive 62, the platen transfer motor 68, the brush bar drive 72, the cam motor 88 and the two tuck motors 100 as well as the encoders of the sizing arms 48, 49, the gage blocks 24, the starting gate 42, the pusher actuator 80, the infeed table assembly vacuum holes and the air cylinder 56, are all coupled to and controlled by the computer 33 in a customary manner. As such coupling and control features of the computer are conventional and well known in the art, a further detailed description concerning the same is not provided.

Since certain changes may be made in the above described improved apparatus for manufacturing hard book covers, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I claim:

1. An apparatus for manufacturing a hard book cover, said apparatus comprising:

a framework defining a longitudinal axis of the apparatus;

an infeed table assembly, supported by the framework, for supporting a cover material having an adhesive on one surface thereof, a pair of opposed panels and a centrally located spine; and the cover material, the pair of opposed panels and the centrally located spine when combined with one another all forming a cover assembly;

a conveying mechanism, supported by the framework, for receiving the cover assembly from the infeed table assembly and conveying the cover assembly to a fold mechanism;

the fold mechanism, supported by the framework, for folding an exposed free end of the cover material around a longitudinal perimeter portion of the cover assembly; and a pair of opposed tuck fingers, coupled to a tuck finger drive mechanism to facilitate movement of the pair of opposed tuck fingers toward one another, and the pair of opposed tuck fingers operating during a standard corner fold of the fold mechanism, the pair of opposed tuck fingers being spaced apart from one another by a sufficient distance to facilitate accommodation of the pair of opposed panels between opposed inwardly facing side surfaces of the pair of tuck fingers, and the tuck finger drive mechanism moving the pair of tuck fingers inwardly toward one another with the pair of opposed panels located therebetween, during the standard corner fold by the fold mechanism, so that the opposed inwardly facing side surfaces of the pair of tuck fingers bias the cover material, located adjacent opposed corners of the opposed panels of the cover assembly, against a vertical wall of the panel to adhesively secure the cover material thereto.

2. The apparatus according to claim 1, wherein the folding mechanism includes a plurality of pusher fingers which apply a force tending to oppose a folding action of the exposed free end of the cover material around a longitudinal perimeter portion of the cover assembly to prevent deflection, by the fold mechanism, of at least one of the panel and the spine during folding of the cover material.

3. The apparatus according to claim 1, wherein the tuck fingers are indexed toward one another, via the tuck finger drive mechanism, by a distance of at least about 1/16 inch.

4. The apparatus according to claim 1, wherein a pressure device is supported by the framework and located between the infeed table assembly and the conveying mechanism for supplying initial pressure to adhesively secure the pair of opposed panels and the spine to the adhesive surface of the cover material.

5. The apparatus according to claim 1, wherein the framework supports a pair of gage blocks, the pair of gage blocks have a retracted position in which the pair of gage blocks are spaced from an upwardly facing surface of the infeed table assembly and an in use position in which the pair of gage blocks are brought into engagement with the infeed table assembly such that the spine may be sandwiched between the pair of gaged blocks to facilitate spacing of the opposed panels from the spine positioned therebetween.

6. The apparatus according to claim 1, wherein the folding mechanism comprises a longitudinally extending brush bar which has a plurality of radially extending brushes, and the brush bar is rotatable by a brush bar drive; and a movable longitudinal pressure bar is normally spaced from the brush bar by a sufficient distance so as to form a cover assembly receiving area to facilitate receiving of the cover assembly therebetween during folding of the cover assembly.

7. The apparatus according to claim 1, wherein the conveying mechanism comprises a lower platen assembly and a mating upper platen assembly;

the lower platen is carried by a platen support structure and is vertically movable and freely rotatable relative to the platen support structure; and the upper platen assembly is supported by the platen support structure and is vertically movable relative to the platen support structure via a vertical platen drive motor and the upper platen assembly is rotatable relative to the platen support structure via a rotatable platen drive motor.

8. The apparatus according to claim 4, wherein a starting block is supported by the framework and is located between a leading edge of the infeed table assembly and the pressure device, and the starting block has a longitudinal alignment member to facilitate alignment of the cover material, relative to the infeed table assembly, and the starting block is retractable, following proper alignment of the cover material relative to the infeed table assembly, to facilitate engagement of a leading edge of the cover material.

9. The apparatus according to claim 4, wherein the pressure device comprises a first pressure nip formed by a first pressure roller and an intermediate pressure roller and a second pressure nip formed by the intermediate pressure roller and a third pressure roller, and a pressure roller drive supplies rotational drive to at least one the first pressure roller, the intermediate pressure roller and the third pressure roller to facilitate rotation thereof and conveyance of the cover assembly.

10. The apparatus according to claim 4, wherein the infeed table assembly, the pressure device, the conveying mechanism and the folding mechanism are all electrically coupled to a computer which controls operation thereof to facilitate substantially automatic production of a hard book cover from the cover assembly.

11. The apparatus according to claim 6, wherein the brush bar has a brush bar clamping device which is rotatable to a position adjacent the pressure bar and the brush bar clamping device and the pressure bar sandwich the cover assembly therebetween to facilitate secure attachment of a folded cover material with at least one of the panels and the spine of the cover assembly.

12. The apparatus according to claim 6, wherein the pressure bar is pivotally supported by the framework and includes a cylindrical roller, the framework supports a cam member driven by a cam drive motor, the cylindrical roller is matingly engaged with the cam member such that rotation of the cam member in a first direction causes the pressure bar to move upwardly, relative to the framework, toward the brush bar and sandwich the cover assembly therebetween to securely adhere the folded cover material with at least one of the opposed panels and the spine and rotation of the cam member in an opposite direction causes the pressure bar to move downwardly, relative to the framework, away from the brush bar.

13. The apparatus according to claim 7, wherein the platen support structure is supported by a pair of parallel extending shafts and a combine platen drive assembly conveys the combined platen drive assembly to and fro along the pair of spaced apart shafts to convey the combined platen assembly to and fro along the longitudinal axis of the apparatus.

14. An apparatus for manufacturing a hard book cover, said apparatus comprising:

a framework defining a longitudinal axis of the apparatus;

an infeed table assembly, supported by the framework, for supporting a cover material having a surface with an adhesive thereon, a pair of opposed panels and a centrally located spine; and the cover material, the pair of opposed panels and the centrally located spine, when combined with one another, all forming a cover assembly;

a pressure device supported by the framework and located between the infeed table assembly and a conveying and rotating mechanism for supply initial pressure to secure adhesively the pair of opposed panels and the spine to the adhesive surface of the cover material;

the conveying and rotating mechanism, supported by the framework, for receiving the cover assembly from the pressure device and conveying the cover assembly to a fold mechanism;

the fold mechanism, supported by the framework, for folding an exposed free end of the cover material around a longitudinal perimeter portion of the cover assembly, the folding mechanism including a longitudinally extending brush bar having a plurality of radially extending brushes, and the brush bar is rotatable by a brush bar drive, the folding mechanism further including a plurality of pusher fingers which apply a force tending to oppose a folding action of the exposed free end of the cover material around a longitudinal perimeter portion of the cover assembly, applied by rotation of the brush bar, to prevent inadvertently deflection, by the brush bar, of at least one of the panel and the spine during folding of the cover material; and a pair of opposed tuck fingers, coupled to a tuck finger drive mechanism to facilitate movement of the pair of opposed tuck fingers toward one another, and the pair of opposed tuck fingers operating during a standard corner fold of the fold mechanism, the pair of opposed tuck fingers being spaced apart from one another by a sufficient distance to facilitate accommodation of the pair of opposed panels between opposed inwardly facing side surfaces of the pair of tuck fingers, and the tuck finger drive mechanism moving the pair of tuck fingers inwardly toward one another with the pair of opposed panels located therebetween, during the standard corner fold by the fold mechanism, so that the opposed inwardly facing side surfaces of the pair of tuck fingers bias the cover material, located adjacent opposed corners of the opposed panels of the cover assembly, against a vertical wall of the panel to adhesively secure the cover material thereto.

15. The apparatus according to claim 14, wherein the tuck fingers are moved toward one another, by the tuck finger drive mechanism, by a distance of at least about $\frac{1}{16}$ inch.

16. The apparatus according to claim 14, wherein the framework supports a pair of gage blocks, the pair of gage blocks have a retracted position in which the pair of gage blocks are spaced from an upwardly facing surface of the infeed table assembly and an in use position in which the pair of gage blocks are brought into engagement with the infeed table assembly such that the spine may be sandwiched between the pair of gaged blocks to facilitate spacing of the opposed panels from the spine positioned therebetween; and a movable longitudinal pressure bar is normally spaced from the brush bar by a sufficient distance so as to form a cover assembly receiving area to facilitate receiving of the cover assembly therebetween during folding of the cover assembly.

17. The apparatus according to claim 14, wherein the conveying mechanism comprises a lower platen assembly and a mating upper platen assembly;

the lower platen is carried by a platen support structure and is vertically movable and freely rotatable relative to the platen support structure;

the upper platen assembly is supported by the platen support structure and is vertically movable relative to the platen support structure via a vertical platen drive motor and the upper platen assembly is rotatable relative to the platen support structure via a rotatable platen drive motor; and the platen support structure is supported by a pair of parallel extending shafts and a combine platen drive assembly conveys the combined platen drive assembly to and fro along the pair of spaced apart shafts to convey the combined platen assembly to and fro along the longitudinal axis of the apparatus.

18. The apparatus according to claim 14, wherein a starting block is supported by the framework and is located between a leading edge of the infeed table assembly and the pressure device, and the starting block has a longitudinal alignment member to facilitate alignment of the cover material, relative to the infeed table assembly, and the starting block is retractable, following proper alignment of the cover material relative to the infeed table assembly, to facilitate engagement of a leading edge of the cover material;

the pressure device comprises a first pressure nip formed by a first pressure roller and an intermediate pressure roller and a second pressure nip formed by the intermediate pressure roller and a third pressure roller, and a pressure roller drive supplies rotational drive to at least one the first pressure roller, the intermediate pressure roller and the third pressure roller to facilitate rotation thereof and conveyance of the cover assembly; and the infeed table assembly, the pressure device, the conveying mechanism and the folding mechanism are all electrically coupled to a computer which controls operation thereof to facilitate substantially automatic production of a hard book cover from the cover assembly.

19. The apparatus according to claim 16, wherein the brush bar has a brush bar clamping device which is rotatable to a position adjacent the pressure bar and the brush bar clamping device and the pressure bar sandwich the cover assembly therebetween to facilitate secure attachment of a folded cover material with at least one of the panels and the spine of the cover assembly; and the pressure bar is pivotally supported by the framework and includes a cylindrical roller, the framework supports a cam member driven by a cam drive motor, the cylindrical roller is matingly engaged with the cam member such that rotation of the cam member in a first direction causes the pressure bar to move upwardly, relative to the framework, toward the brush bar and sandwich the cover assembly therebetween to securely adhere the folded cover material with at least one of the opposed panels and the spine and rotation of the cam member in an opposite direction causes the pressure bar to move downwardly, relative to the framework, away from the brush bar.

20. A method of manufacturing a hard book cover, the method comprising the steps of:

defining a longitudinal axis via a framework of an apparatus;

supporting an infeed table assembly, for supporting a cover material, on the framework; placing a cover material with an adhesive on a top surface thereof on the infeed table assembly and thereafter placing a pair of opposed panels and a centrally located spine on the top surface of the cover material to form a cover assembly;

supporting a conveying mechanism on the framework and receiving the cover assembly from the infeed table assembly and conveying the cover assembly to a fold mechanism;

supporting the fold mechanism on the framework and receiving the cover assembly from the conveying mechanism and folding, via the fold mechanism, an exposed free end of the cover material around a longitudinal perimeter portion of the cover assembly; and coupling a pair of opposed tuck fingers to a tuck finger drive mechanism to facilitate movement of the pair of opposed tuck fingers toward one another during a standard corner fold of the fold mechanism, spacing the pair of opposed tuck fingers apart from one another by a sufficient distance to facilitate accommodation of the pair of opposed panels between opposed inwardly facing side surfaces of the pair of tuck fingers, and the tuck finger drive mechanism moving the pair of tuck fingers inwardly toward one another with the pair of opposed panels located therebetween, during the standard corner fold by the fold mechanism, so that the opposed inwardly facing side surfaces of the pair of tuck fingers bias the cover material, located adjacent opposed corners of the opposed panels of the cover assembly, against a vertical wall of the panel to adhesively secure the cover material thereto.

* * * * *